United States Patent [19]

Bergerioux et al.

[11] Patent Number: 4,971,513

[45] Date of Patent: Nov. 20, 1990

[54] METHOD OF MAKING UP BATCHES OF SMALL ITEMS

[75] Inventors: Jean-Marcel Bergerioux, Chateauneuf sur Isere; Claude Pavie, Houilles; Christian Plent, Bourg Les Valence, all of France

[73] Assignee: Societe Anonyme dite: Compagnie Generale D'Automatisme CGA-HBS, Paris, France

[21] Appl. No.: 368,508

[22] Filed: Jun. 20, 1989

Related U.S. Application Data

[62] Division of Ser. No. 30,648, Mar. 27, 1987, Pat. No. 4,874,281.

[30] Foreign Application Priority Data

Mar. 27, 1986 [FR] France ................................ 86 04449

[51] Int. Cl.⁵ ............................................ B65G 37/00
[52] U.S. Cl. ...................................... 414/786; 414/285
[58] Field of Search .................... 198/370, 477.1, 706, 198/358, 356, 366, 348, 424, 349.5; 209/583, 900, 698; 414/786, 416, 417, 403, 404, 269, 270, 271, 273, 285, 406, 331; 186/55, 56, 58

[56] References Cited

U.S. PATENT DOCUMENTS

| 3,055,486 | 9/1962 | Meyer | 198/706 |
|---|---|---|---|
| 3,757,939 | 9/1973 | Henig | 209/900 X |
| 3,967,740 | 7/1976 | Molins | 414/331 |
| 4,542,808 | 9/1985 | Lloyd, Jr. et al. | 209/564 X |
| 4,567,988 | 2/1986 | Weibel | 209/698 X |
| 4,651,863 | 3/1987 | Reuter et al. | 414/331 X |
| 4,669,047 | 5/1987 | Chucta | 414/331 X |
| 4,688,678 | 8/1987 | Zue et al. | 209/698 X |

Primary Examiner—Frank E. Werner
Attorney, Agent, or Firm—Sughrue, Mion, Zinn, Macpeak & Seas

[57] ABSTRACT

The installation comprises a delivery conveyor (4) for delivering unit items in buckets (5). A station (3) injects unit items onto the delivery conveyor. A sorting conveyor (6) carries packs (8) corresponding to respective batches to be made up. The sorting conveyor is disposed relative to said delivery conveyor so as to establish at least one item transfer zone therebetween. A central control unit (10) ensure that desired coincidences occur between item-containing buckets (5) and packs (8) for receiving the items, with the control units controlling the transfer of items from the buckets to the packs. The invention is particularly applicable to making up batches of items in response to orders therefor.

5 Claims, 18 Drawing Sheets

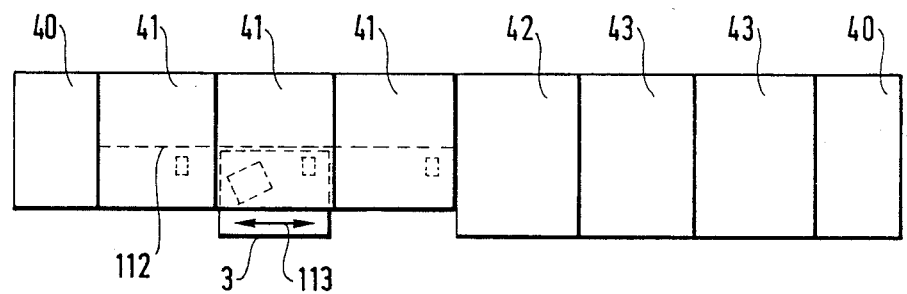
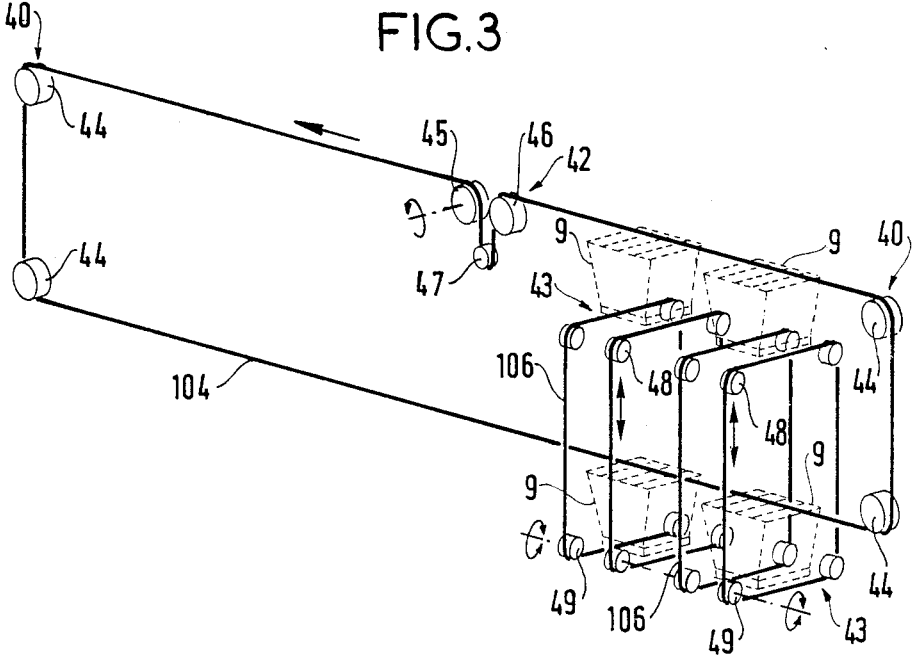

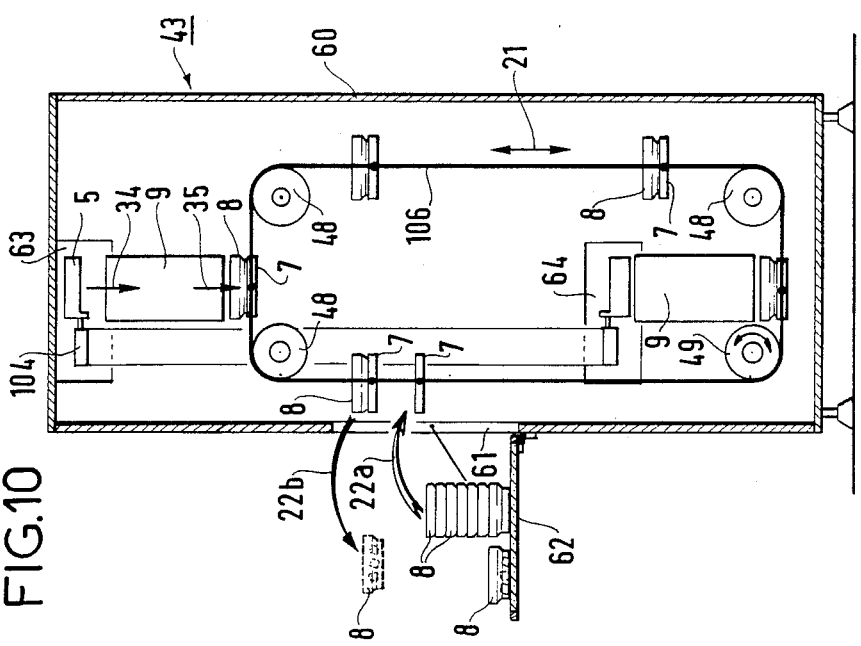
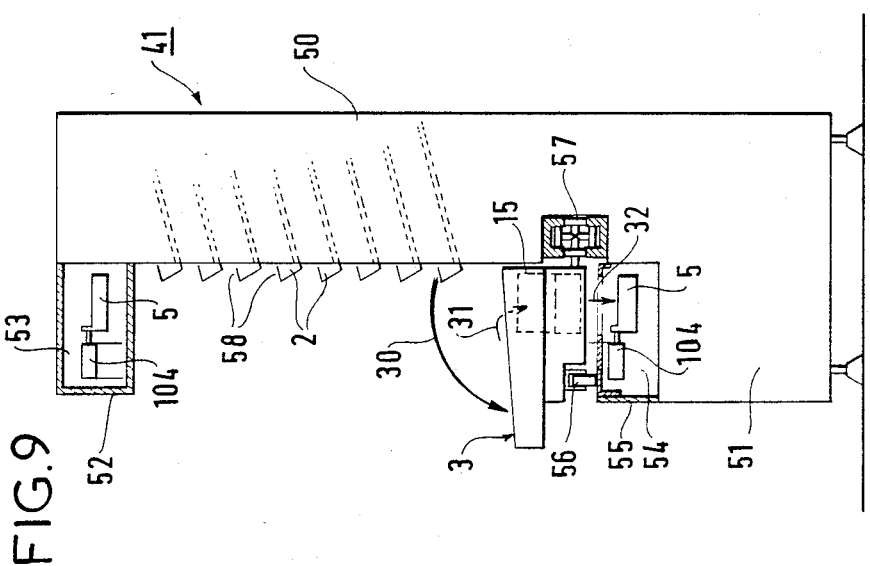

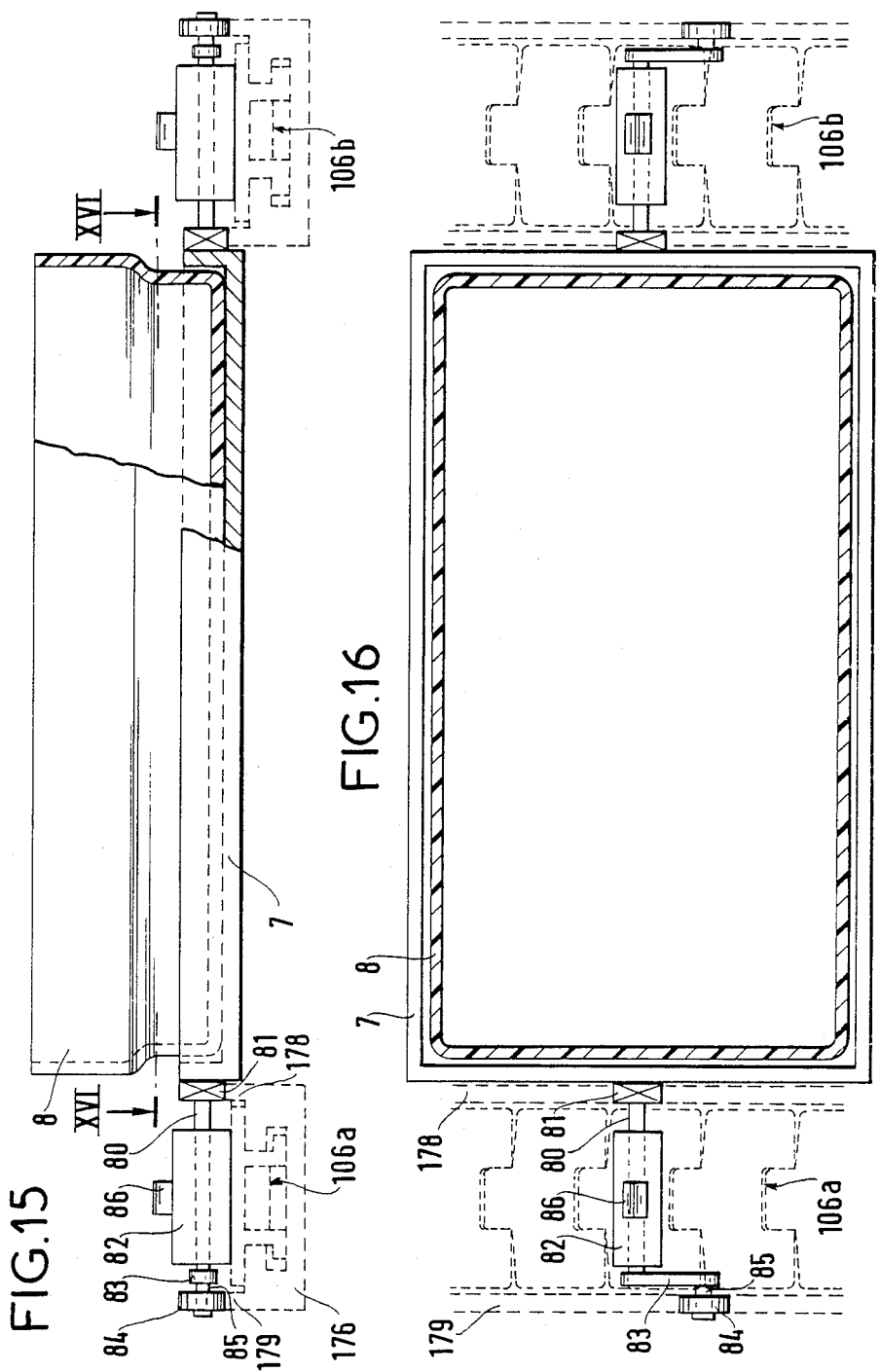

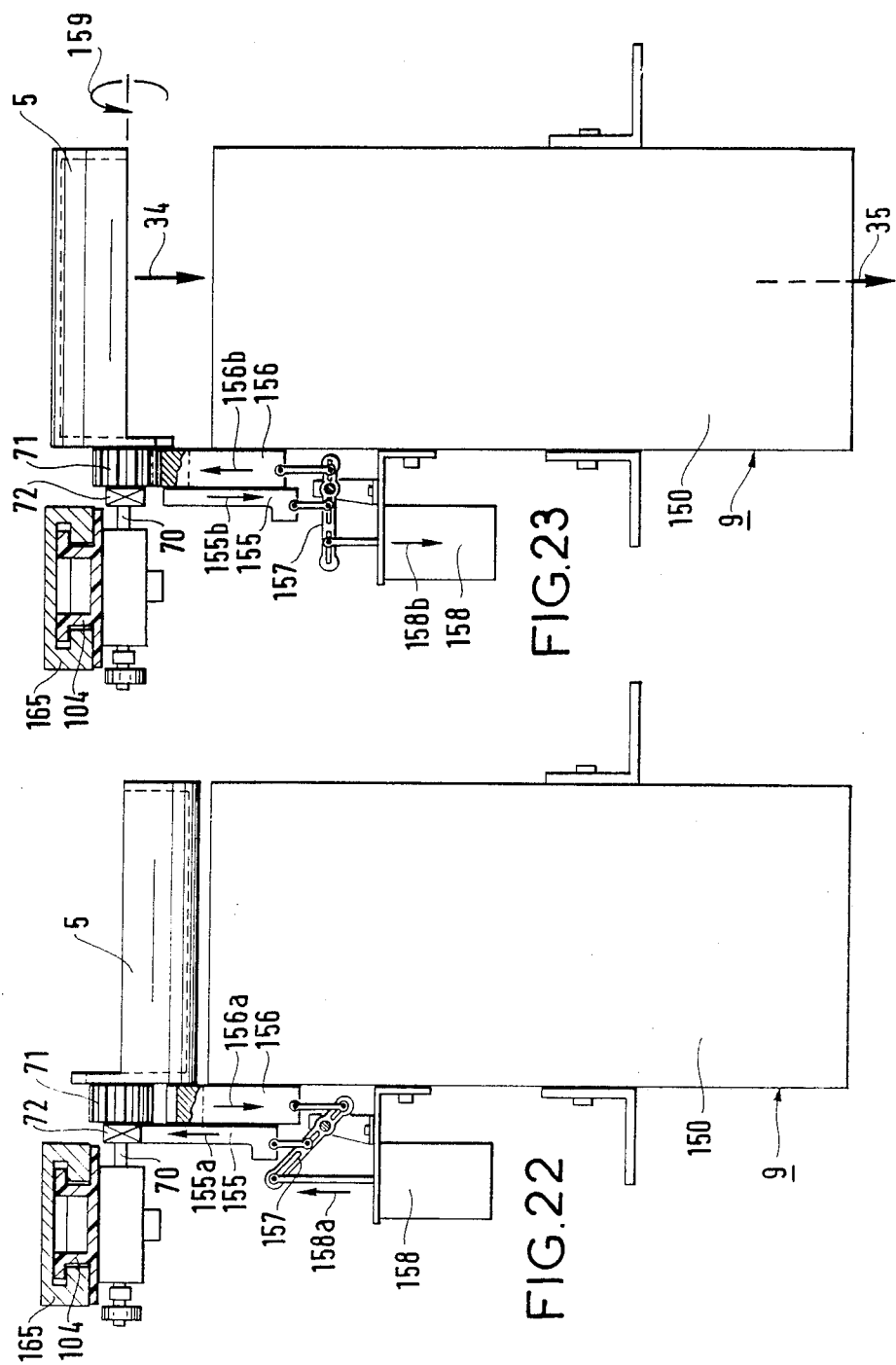

METHOD OF MAKING UP BATCHES OF SMALL ITEMS

This is a divisional of application Ser. No. 07/030,648, filed Mar. 27, 1987, now Pat. No. 4,874,281.

The present invention relates to dispensing small items or articles in response to a set of orders each of which defines the different types of article and the quantity of each different type required to constitute a batch of articles corresponding to the order in question. Said articles are selected from a plurality of available types of article.

BACKGROUND OF THE INVENTION

The invention is advantageously applicable to dispensing medicines, in particular in hospitals, in order to make up batches of medicines with the batches corresponding to individual patients, and with the batches of medicines for all of the patients in a single service being made up together in response to a set of prescriptions. The invention is naturally also applicable to dispensing other small articles, in shops, warehouses, workshops, etc., for example pieces of hardware or electronic components, with the articles being made up into individual batches in response to a set of orders made out by a set of customers or by a given production service.

Numerous devices are already known for dispensing goods in response to orders, and in particular for dispensing pharmaceutical products in pharmacies, or in central services for supplying goods to pharmacies.

Prior art devices of this type have been developed, in particular, for storing large quantities of the products, using automated handling and with selected articles being brought together in response to each order. Such devices are controlled by an electronic system from a console or by means of a computer having a terminal and a keyboard, and such systems also provide stock-keeping functions and keep track of items that need re-supplying.

Thus, for example, U.S. Pat. No. 3 819 088 describes a device for storing and dispensing objects, with the device comprising a plurality of vertical drawers each constituted by a row of vertical compartments. Each compartment contains a stack of identical objects in the form of boxes or the like. The drawers belong to one or more storage modules. They are individually movable within the corresponding module in translation in a direction perpendicular to the compartments, thereby enabling any one of the compartments in a drawer driven in translation to be positioned over a transporter belt corresponding to the module. Through a suitable compartment bottom, a cleat driven by the belt engages the desired object which is at the bottom of the stack contained in the compartment, thereby extracting the object. The object drops onto the transport belt and is thus driven by this belt or by other belts to a central recovery point, while the drawer is returned to its initial position in its module.

Such prior art systems relate essentially to organizing the storage bay and to the means for automatically extracting each desired object. They process received orders one after the other.

The present invention seeks to provide a different mode of dispensing objects, suitable for operating on articles which are packaged in unit packs or in boxes of several articles, in order to make up individual batches in response to a set of orders, said mode of dispensing objects being independent of the manner in which the objects are taken from storage (i.e. the objects may be taken manually or automatically), thereby enabling the invention to be readily adapted to storage systems which already exist, while providing significant improvement in the services rendered and a considerable gain in productivity.

SUMMARY OF THE INVENTION

The present invention provides a method of making up batches of small items in individual packs in response to a set of orders specifying the different varieties of item required in each batch together with the corresponding quantities thereof, said batches being made up by controlling the transfer of items from a closed delivery path for delivering unit items taken from a stock to at least one closed sorting path orthogonal to the delivery path for making up said batches, said paths having at least one transfer zone therebetween, and the method comprising the following steps:

memorizing the set of orders and combining the orders in the set to establish a list of all of the different varieties of item ordered together with the quantity of each variety required to make up all of the batches specified in the set of orders;

placing packs on the, or each, of said sorting paths for displacement therealong, with each pack being associated with a corresponding one of the ordered batches of items;

taking each of the varieties of item in said list in succession and injecting the required quantity of items one-by-one onto said delivery path; and organizing said transfer of the injected items by causing the items which have been injected onto the delivery path to coincide with the packs that are to receive them in said transfer zone(s) between the paths, and ensuring that each of said items is transferred into a suitable pack.

The present invention also provides an installation for implementing the above-defined method, wherein said plurality of possible varieties of items is stored in a storage bay, variety by variety, the installation including:

a first or "delivery" conveyor for delivering individual items, said delivery conveyor being disposed in a closed loop running substantially along the entire length of said installation and defining said delivery path;

a station for injecting individual items onto the delivery conveyor and mounted facing both said storage bay and said delivery conveyor;

at least one second or "sorting" conveyor mounted transversely to the delivery conveyor and defining said transfer zones therebetween;

first drive means for driving said delivery conveyor;

individual second drive means for driving the, or each, sorting conveyor; and a central control unit coupled to said injection station in order to determine the position of each item injected onto said delivery conveyor, and to said individual second drive means in the, or each, sorting conveyor to organize the transfer of items;

the installation including the improvement whereby the delivery conveyor is a bucket conveyor including fixed first means for holding said conveyor buckets horizontal throughout the path of said delivery conveyor except in the transfer zone(s), and including in said transfer zone(s) both moving second means for holding the buckets horizontal and moving third means for tipping the buckets, said moving second and third means being mounted in a reciprocating configuration whereby whenever one of them is retracted the other one of them is engaged, said reciprocating configuration being controlled by a control member, itself under the control of said central control unit.

Preferably each of said buckets is carried by a support shaft which is mounted free to rotate in a support part on said delivery conveYor and which also carries a bearing shoe and a crank lever having a terminal wheel for guiding said bucket horizontally through said first and second means for holding the buckets horizontal as they move round their path.

Advantageously, said support shaft of each bucket also carries a wheel suitable for engaging said third means for tipping the buckets in the transfer zone(s).

The injection station may be is in the form of a desk fitted with a drawer which is movable in translation over slides between a first, item-receiving position and a second, injection position for injecting a received item into that one of the buckets on the delivery conveyor which is adjacent said injection position of the drawer.

In one embodiment, the drawer is driven from its itemreceiving position to its position for injecting the received item into the bucket arriving at the injection station by directly engaging the bucket which is to receive the item, and is disengaged from the bucket at the end of its stroke into its injection position. thereby releasing it for resilient return to its item-receiving position.

Advantageously, the installation is modular in construction thereby enabling its capacity and its configuration to be adapted to various different circumstances, and in particular to different storage bays.

BRIEF DESCRIPTION OF THE DRAWINGS

Embodiments of the invention are described by way of example with reference to the accompanying drawings, in which:

FIGS. 2 and 3 are respectively a plan view and a diagrammatic perspective view of the moving parts of an installation in accordance with the invention in a rectilinear configuration;

FIG. 9 is a profile view of a storage module constituting a part of the installation shown in FIG. 8;

FIG. 10 is a profile section view through a sorting module in the installation shown in FIG. 8;

FIG. 15 is a partially cutaway elevation view of a tray having a pack mounted therein, forming a part of a sorting conveyor in the installation shown in FIG. 1 or 8;

FIG. 16 is a plan view in partial section on line XVI—XVI of the tray shown in FIG. 15;

FIGS. 22 and 23 are two side views of the FIG. 21 transfer member, showing how it operates;

MORE DETAILED DESCRIPTION

An installation in accordance with the present invention is described, by way of non-limiting example, with reference to making up batches of medicines in a central pharmacy of a hospital. The medicines are initially packaged in unit doses, and are referred to as unit medicines. Each batch of unit medicines is made up for a group of patients for example the patients in any given service, as a function of the prescriptions made out for the patients in the service.

Naturally, the invention is applicable to other uses. For example it may be used to make up batches of small components as a function of orders therefor.

Likewise, the medicines or other items to be issued may themselves be available in the form of multiple-item packages, rather than in unit doses or packages depending on the needs of a particular application.

Figure 1:
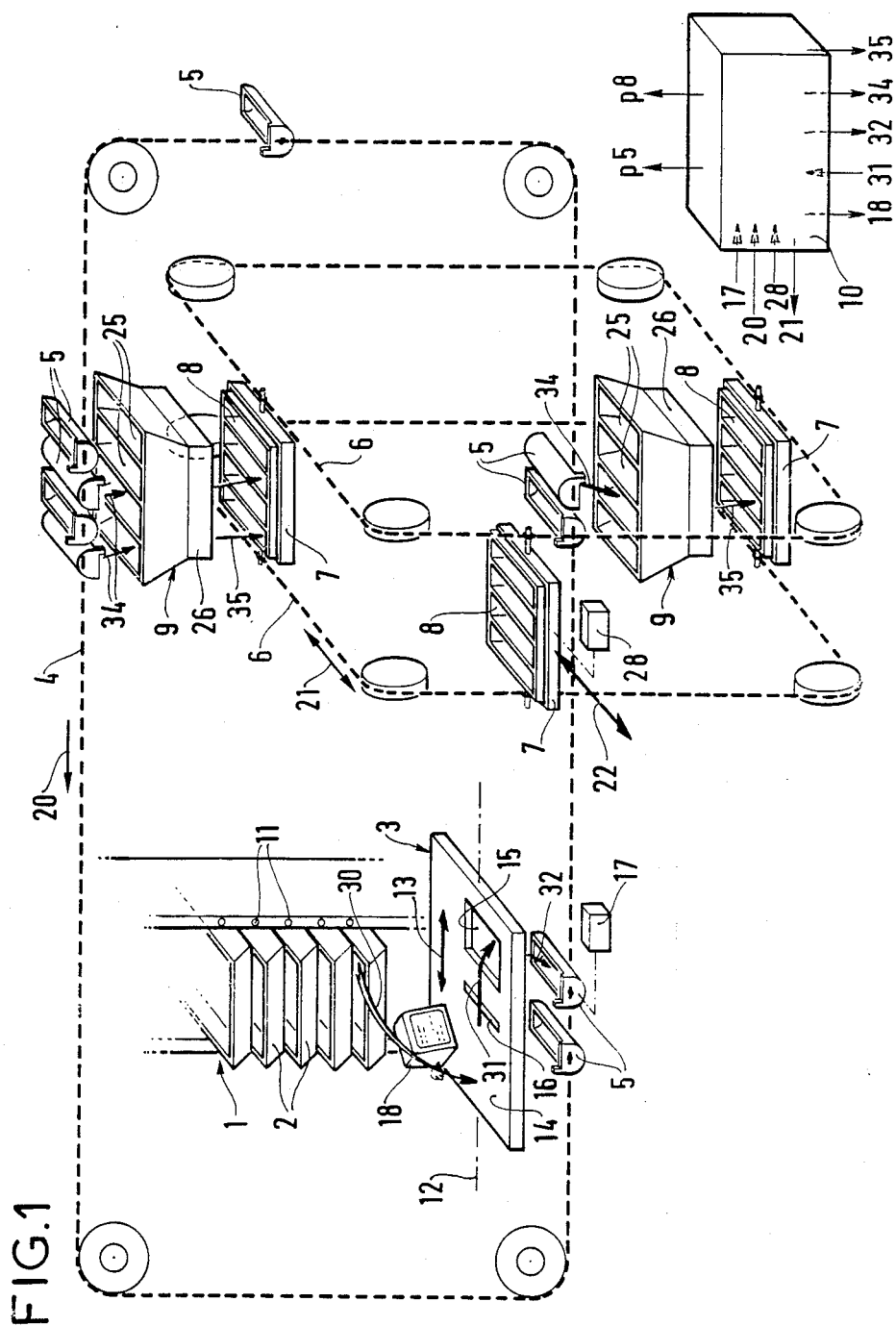
FIG. 1 is a diagram of an installation in accordance with the invention showing how batches of items or articles are made up in said installation.

FIG. 1 is a diagram for use in explaining the operation of an installation in accordance with the invention as installed in a hospital pharmacy. This installation comprises:

a medicine storage bay shown diagrammatically at 1 in the form of a single storage module having superposed drawers 2, it being understood that the bay as a whole may include a plurality of similar modules, each having several rows of superposed drawers;

a desk 3 movable past the front of the storage bay and constituting for the purposes of the installation a unit medicine injection station, likewise referenced 3;

a first closed loop sorting conveyor 4 carrying a plurality of buckets 5, said first conveyor being referred to as a "delivery" conveyor and passing close to the injection station 3 in order to receive unit medicines in its buckets, at one medicine per bucket; and a second endless conveyor 6, referred to as a "sorting" conveyor and being of the type comprising two parallel endless strands carrying a plurality of trays 7 each capable of receiving one or more containers or packs 8, with at least some of the packs being intended to receive respective batches of medicines as they are made up, and serving to store the batches, said packs being referred to as patient packs.

The sorting conveyor 6 is mounted relative to the distribution conveyor 4 having buckets 5 so as to have zones where the conveyors pass close to each other, said zones constituting transfer zones where unit medicines may be transferred from the buckets to the packs.

This installation also comprises:

a transfer member 9 located in each transfer zone for actually performing transfer from the distribution conveyor 4 to the sorting conveyor 6; and a memory, monitoring and control unit 10 controlling the installation as a whole. Although said unit is shown mounted local to the installation, it could alternatively be remotely located, or it could comprise portions that are local and other portions that are remote.

In such an installation, a storage bay 1 will be used, in practice, to store from 150 to 600 varieties of medicine, in at least as many drawers 2 with each drawer corresponding to a single variety of medicine. Display lamps 11 disposed on one of the risers of each column of drawers and level with respective ones of the drawers serve to mark individual drawers in the storage bay. A storage bay comprising drawers of this type is common practice in existing storage equipment.

This storage bay 1 is organized for manual extraction of the medicines from the drawers. The storage bay could be organized differently so as to allow the medicines to be extracted automatically. For example, if automatic extraction is required, the medicines may be packaged in the form of continuous strips or in boxes, and the storage bay may comprise vertical compartments fitted with appropriate tools at the bottoms thereof for cutting a medicine from a strip of medicines or for extracting a single box, in conventional manner for automatic dispensing machinery. The automatically-extracted medicines are then moved to the injection zone of the installation by any appropriate means. In such an automatic installation there would be a fixed injection zone corresponding to the moving desk of the manual installation desrcibed herein.

In the embodiment shown, the desk 3 constituting the medicine injection station is mounted on a guide path referenced 12. The desk can move in either direction as shown by double-headed arrow 13 so as to be located adjacent to any one of the sets of drawers, or any one of the storage modules.

The desk 3 has a reception zone 14 for receiving medicines taken from the storage bay, and an injector member 15 for injecting medicines into the buckets 5 of the delivery conveyor 4, with each bucket receiving only one medicine. The injector member 15 is shown diagrammatically in the form of a trap door incorporated in the surface of the desk.

Advantageously, the same desk also includes a code reader in the form of a code reading window 16 in the surface of the desk between the reception zone 14 and the injector member 15. Whenever a medicine passes over the window 16, the reader reads a code such as a bar code mounted on each medicine, said codes being applied to the various medicines prior to their inclusion in the storage bay 1.

The desk also includes various display lamps and control knobs, not shown. Further, although not shown specifically in FIG. 1, the desk is fitted with a device for establishing its own position along its guide path, said device being constituted by a coder, for example. The desk may be coupled to a motor for driving it along the guide path 12 in one direction or the other.

The desk is a moving work station for the operator and is equipped with a display screen 18 on which various instructions and other information are displayed, in particular concerning the medicines to be taken from the storage bay, with the display being under the control of the central control unit 10.

The closed loop delivery conveyor 4 having buckets 5 is driven at constant speed in one direction only, as indicated by arrow 20. The buckets are mounted so as to be capable of tipping upside-down when they pass over one of the transfer members 9 for transferring medicines from the delivery conveyor to the sorting conveyor.

The position on the delivery conveyor of each bucket that has received a medicine is determined. This is done by means of a coder or code reader 17 (depending on whether the buckets have individual identity codes marked thereon) serving to identify each medicine-conveying bucket at, or in the immediate vicinity of, the injection station. The coder 17 is advantageously placed in the immediate vicinity of the exit from the injection zone. Bucket identification data is then supplied to the central control unit 10, which then keeps track of the position p5 of each bucket, taking account of its constant speed of displacement in the direction of arrow 20.

The sorting conveyor 6 having trays 7 of packs 8 comprises two chains or belts running in parallel and having the trays 7 extending therebetween. These two chains or belts are coupled so as to be driven synchronously. The sorting conveyor 6 is driven stepwise in either direction as indicated by double-headed arrow 21. The trays 7 on the sorting conveyor 6 may either receive a single compartmented patient pack 8, as illustrated, or else a plurality of juxtaposed smaller individual packs. These packs are mounted on the trays 7 or are removed therefrom at a work station having access to the sorting conveyor for pack manipulation, as shown diagrammatically by double-headed arrow 22.

Naturally, a plurality of closed loop sorting conveyors such as the sorting conveyor 6 may be juxtaposed in the installation. Each such conveyor is then driven individually.

The position of each tray, and thus the position of each pack carried by a tray is advantageously determined on the sorting conveyor. A coder or code reader 28 (as appropriate) identifies each of the packs or pack-carrying trays when the packs are mounted in the sorting conveyor. This identification data is supplied to the control unit 10 together with data concerning the displacement of the packs in one or other direction of arrow 21, thereby enabling the control unit 10 to establish the position p8 of each pack 8 on the sorting conveyor.

The transfer members 9 are fixed. Each transfer member comprises as many individual transfer hoppers 25 as there are compartments in a pack or packs on a tray. Each transfer member is generally flared at its inlet end for receiving medicines into individual hoppers, and its tapering outlet end is shaped to correspond with the packs or with individual compartments therein. The bottom 26 of each hopper is individually openable under control, thereby enabling each hopper to serve as a temporary storage location for a medicine contained therein.

Operation of the installation for making up batches of medicines for groups of patients is described below as a series of successive steps.

Initially, the state of the stock of the various medicines in the storage bay is verified and, where necessary, the stocks are topped up, with the state of the stocks being given by the control unit 10 and with the various storage drawers being filled either manually or automatically.

The prescriptions or orders for each of the patients in a group of patients are directly keyed in to the control unit 10 from terminals distributed in the various services in the hospital, or else they are keyed in to the unit 10 from a terminal local thereto. The operator then places as many individual packs 8 as there are orders or patients on the trays of the sorting conveyor 6. The packs are simultaneously identified by the unit 10. The unit 10 then associates each pack with a different respective one of the orders and keeps permanent track of the positions of the packs on the sorting conveyor so as to make up each batch in the appropriate pack. Advantageously, the packs are also marked in the clear with the name or the number of the various patients for which they are intended. A keyboard (not shown) enables the operator to key in this information in the clear into the control unit 10 which then matches up the various batches and the various packs;

on the basis of the order data memorized in the unit 10, the control unit 10 establishes a combined list of requirements including the total number of medicines required for each type of medicine that has been ordered at least once. The control unit 10 then controls the process of making up the batches of medicines by displaying to the operator the types of the medicines which should be taken, together with the corresponding quantities required, and the locations of the medicines in the storage bay, and this continues repetitively for all the varieties of medicine required;

the operator positions the desk or controls the positioning thereof so as to bring it substantially level with the set of drawers containing the displayed variety of medicine, takes a handful of individual medicines from the drawer, said handful corresponding approximately to the required quantity, and places the medicines on the reception zone 14 of the desk 3. This operation is represented diagrammatically by arrow 30 leading from one of the drawers 2 to the zone 14 on the desk;

the operator then passes the unit medicines taken from the drawer one-by-one past the read window 16 and into the injector member 15 for injection into the delivery conveyor 4. This operation of feeding the injector member together with prior reading of the identification codes marked on each unit medicine is represented diagrammatically by arrow 31. Thus, the unit medicine to be injected onto the delivery conveyor is simultaneously verified and counted, and once the number of injected medicines of the same type has reached the number requested, the operator returns the remaining medicines to the drawer from which they were taken;

the injector member injects the unit medicines one after another into successive buckets as they pass therebeneath, without stopping the buckets and ensuring that only one unit medicine is injected into each bucket. There is no need for all of the buckets driven by the delivery conveyor and passing beneath the injector member to receive a medicine. Arrow 32 represents this injection operation. The bucket then conveys the unit medicines towards the transfer members;

those buckets which receive a unit medicine are identified simultaneously with the injection operation for marking purposes so as to enable the central unit to keep track permanently of their positions on the delivery conveyor so long as they hold a unit medicine;

the control unit 10 organizes rendez-vous between successive buckets on the delivery conveyor which is driven at constant speed and in one direction only with the packs on the sorting conveyor which is driven stepwise in either direction. The rendez-vous take place via the hoppers of the transfer members 9. This is done from the position data p5 relating to each bucket on the delivery conveyor carrying a unit medicine and the position data p8 of each pack on the sorting conveyor. Arrow 34 represents the operation of passing the unit medicine contained in one of the buckets into an appropriate hopper. This is done by the unit 10 causing the bucket to rotate into an upside-down position over the hopper. Arrow 35 represents the operation of passing a medicine from one of the hoppers into the corresponding compartment of the appropriate pack. When, for whatever reason, the unit medicine contained in one of the buckets is not transferred as the bucket passes through the transfer members, the bucket containing the medicine is merely recycled and the medicine can be transferred next time it passes through the transfer members after looping once all the way round the delivery conveyor; and after all the different varieties of medicine have been processed, one after the other, the packs on the sorting conveyor contain respective batches of medicines for the various different patients in a given group.

The operator can then remove the packs from the sorting conveyor to enable them to be transported to the service which ordered these particular batches of medicines to be made up.

The unit 10 controls operation of the installation and the references of the main circuits at various points in the installation or the references of the operations that they control are therefore marked directly on the control unit 10.

It will readily be understood from FIG. 1 that, in practice, the installation is modular in design. It may comprise a variable number of storage modules and also a variable number of sorting modules, with each sorting conveyor being equipped with its own trays and transfer members from the delivery conveyor to the corresponding sorting conveyor, and the delivery conveyor therefore loops through all of the sorting conveyors in order to provide two possible transfer zones with each of them.

Figure 4:
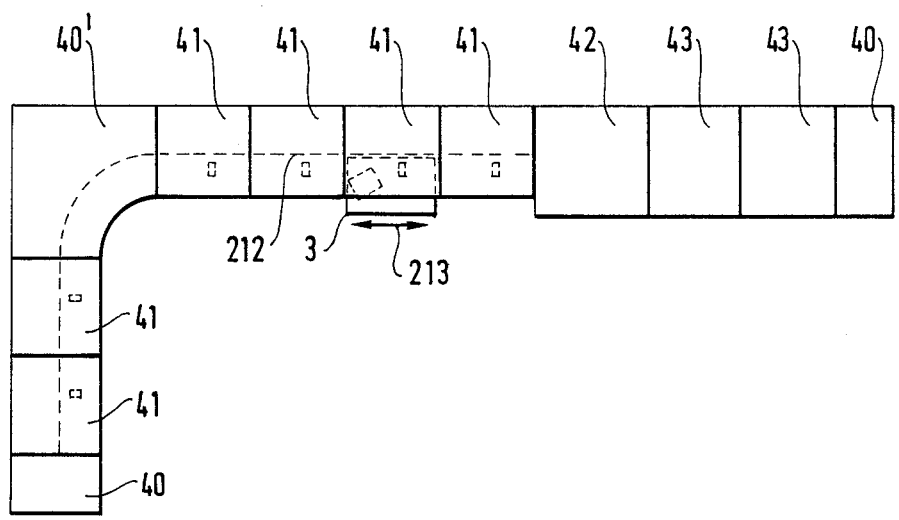
FIGS. 4 and 5 are respectively a plan view and a diagrammatic perspective view of the moving parts of an installation in accordance with the invention in an L-shaped configuration.
Figure 5:
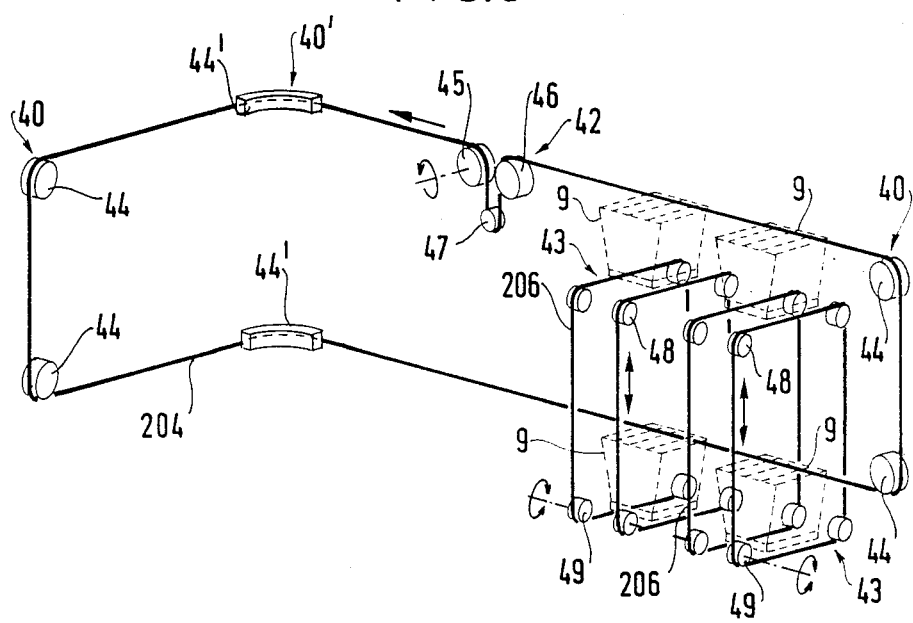
Figure 6:
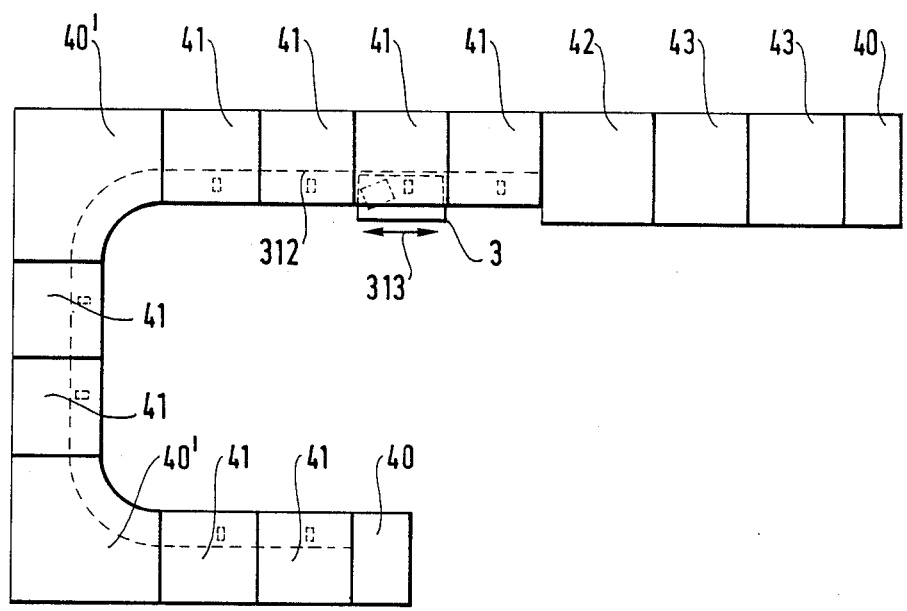
FIGS. 6 and 7 are respectively a plan view and a diagrammatic perspective view of the moving parts of an installation in accordance with the invention in a U-shaped configuration.
Figure 7:
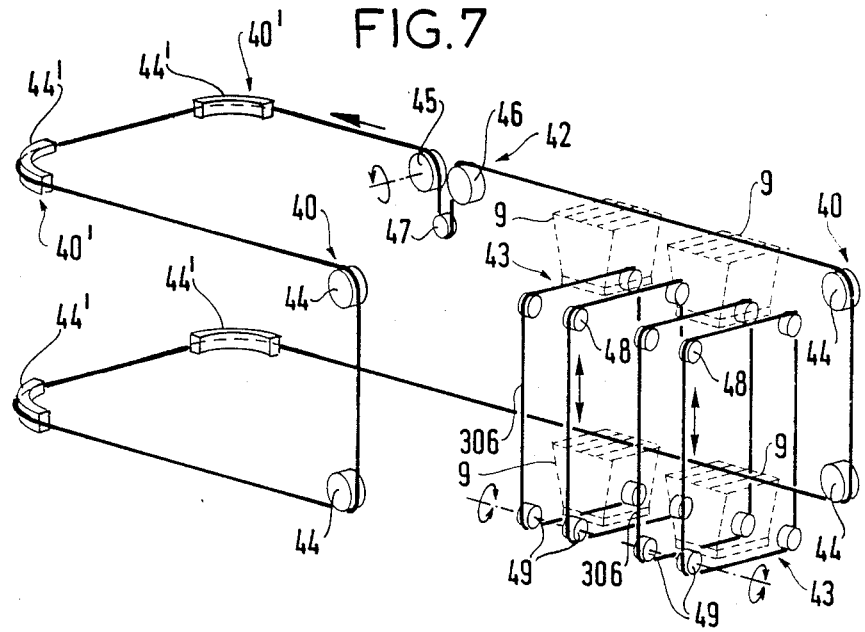

FIGS. 2, 4, and 6 are plan views of three possible configurations of an installation in accordance with the invention. FIGS. 3, 5, and 7 are corresponding perspective diagrammatic views of the conveyors in said installations, and in each case it is assumed that the installation has two sorting conveyors. Which particular configuration is selected for any given installation depends, in practice, on the location in which the installation is installed. The number of storage modules and the number of sorting modules in an installation are defined, in particular, by the amount of room available at the intended site and also on the desired processing capacity for the installation.

FIGS. 2 and 3 correspond to a rectilinear configuration: the various modules of the installation are disposed in-line.

The installation shown comprises, in order and one after the other: a first or "terminal" module 40, three storage modules each referenced 41 and together constituting the medicine storage bay, a tensioning and drive module 42, two sorting modules each referenced 43, and a second terminal module identical to the first terminal module 40 and likewise referenced 40. The desk in this installation bears the same reference numeral 3 as used above and projects from the front of one of the storage modules 41. It has a linear guide path 112 shown in dashed lines and is capable of moving in either direction, as shown in double-headed arrow 113 therealong, in order to take up a position in front of any one of the three storage modules.

In this rectilinear configuration for an installation, the delivery bucket conveyor is referenced 104. It is constituted by a closed loop running over substantially the entire length of the installation. In this case, the loop occupies a vertical plane having one horizontal branch running substantially along the top of the installation and having its other horizontal branch running along at an intermediate level beneath the desk 3. Each of the two terminal modules 40 has a pair of deflector wheels 44 defining a respective vertical branch of the closed loop of the conveyor. The tensioning and drive module 42 located between the storage modules 41 and the sorting modules 43 includes a drive wheel 45 coupled to a drive motor (not shown) which is housed therein and which drives the delivery conveyor.

The drive wheel 45 in the tensioning and drive module 42 is located between a deflection wheel 46 and a tensioning wheel 47 and between them they establish suitable tension in the delivery conveyor.

In a variant, the closed loop formed by the delivery conveyor may occupy a horizontal disposition. In this case the conveyor is located a short distance beneath the level of the desk 3 and passes between the front and the back of the installation while remaining at the same level.

In each sorting module 43, the corresponding sorting conveyor with trays is referenced 106. Each sorting conveyor is constituted by a pair of closed loops which are linked through the loop of the delivery conveyor and which extend over substantially the full height of the installation. Each of these loops occupies a vertical plane and is disposed to have two horizontal portions passing beneath corresponding ones of the long horizontal branches of the delivery conveyor. Each sorting module includes two sets of four wheels arranged in pairs so as to deflect each of the closed loops through a right angle at each wheel. In each set of four wheels, three of the sets of wheels are deflector wheels only and are referenced 48 while the fourth set of wheels is also a set of drive wheels and is referenced 49. Each set of drive wheels 49 on each of the two belts of each sorting conveyor 106 is coupled to a corresponding motor and gearbox unit including indexing means, and serving to drive the sorting conveyor in either direction.

Although not shown, it is advantageous for all four pairs of wheels 48 and 49 in each sorting module to be drive wheels. They are driven synchronously by coupling the various pairs of wheels by means of external toothed belts.

The motor and gearbox units including the indexing means are not shown individually, and they are housed in the corresponding sorting module.

In each sorting module 43, there are two transfer members referenced 9 in FIG. 1, one for each of the two possible transfer zones, to enable suitable transfers to take place between the delivery conveyor 104 and the sorting conveyor 106 in the sorting module.

All of the sorting modules are identical to one another and they are mounted side-by-side, one after the other.

FIGS. 4 and 5 concern a second or L-shaped installation. The various modules making up the installation are disposed around an L-shape. Where these modules are identical to modules in a rectilinearly configured installation, they are designated by the same references. It can be seen that this installation comprises a first terminal module 40, storage modules 41 disposed side-by-side one after the other in the two branches of the L, a tensioning and drive module 42 beyond the storage module sequence or bay, followed by two sorting modules 43, and a second terminal module 40.

In between the storage modules belonging to different branches of the L, there is an angle module 40'. This angle module serves solely to provide an angular transition between the two groups of storage modules 41 in the overall storage bay.

In this second configuration, the delivery conveyor is referenced 204, and the sorting conveyors are referenced 206. Each of the sorting conveyors is in the form of a pair of closed loops occupying respective vertical planes and linked round the closed L-shaped loop of the delivery conveyor which occupies two vertical planes and which runs substantially along the top of the installation, along the ends thereof, and under the desk 3 therein.

References in FIG. 5 which are identical to references appearing in FIG. 3 designate identical items which are therefore not described again. It can be seen from FIG. 5 that the L-shaped configuration of the closed loop formed by the delivery conveyor 204 is obtained by means of two additional guides 44' located in the angle module 40'.

In this L-shaped installation, the desk 3 which projects from the front of one or other of the storage modules 41 is movable in translation in either direction along double-headed arrow 213 past all of the storage modules in the storage bay, and its guide path 212 is shown in dashed lines and follows an arcuate transition around the corner of the L-shape.

FIGS. 6 and 7 show a third or U-shaped configuration for an installation. The various modules constituting the installation are disposed to occupy a U-shape.

One of the two main arms of the U in the installation is truncated. Where the modules in this installation are identical to modules in either of the preceding configurations, they have the same references, and the component parts thereof are likewise given the same references.

The U-shaped installation has a first terminal module 40, first, second and third series of storage modules 41, with the various series being separated from the adjacent series by corresponding angle modules 40', a tensioning and drive module 42, sorting modules 43, and then a second terminal module 40.

In this configuration, the delivery conveyor is referenced 304 and each of the sorting conveyors is referenced 306. The delivery conveyor occupies a U-shaped closed loop with one of the arms of the U-shape being truncated. The closed loop passes around the installation substantially along the top thereof, up or down the ends thereof and beneath the desk 3. Each of the sorting conveyors comprises two closed loops linked through the loop of the delivery conveyor and located on the non-truncated arm of the U-shape.

In the modules of this U-shaped installation, wheels and guides provide change-of-direction transitions in the loops of the conveyors and drive the conveyors individually. These wheels and guides have the same references as corresponding wheels and guides shown in FIGS. 3 and 5. Two transfer members 9 provide for transfers between the delivery conveyor and the sorting conveyors of the various sorting modules.

The desk 3 in this installation projects forwardly from one of the storage modules 41. It is mounted to move in either direction indicated by double-headed arrow 313 past the front of the entire storage bay including the two angle modules 44'. Its guide path 312 is shown in dashed lines and follows two arcuate transitions located in the angle modules 40'.

As for the installation shown in FIG. 3, the installations shown in FIGS. 5 and 7 may be varied in that the delivery conveyor could run in a horizontal plane round the back of the installation (i.e. remaining at a level slightly lower than the level of the desk) rather than having a portion running round the top of the installation.

It may be observed with reference to FIGS. 2 to 7 that the various delivery conveyors 104, 204, and 304 are located slightly in front of the storage bay in a position comparable to the projecting position of the desk 3. This forward projection of the delivery conveyor is not visible in the plan views shown because the delivery conveyor is received in an overhanging cornice structure associated with each storage module.

Figure 8:
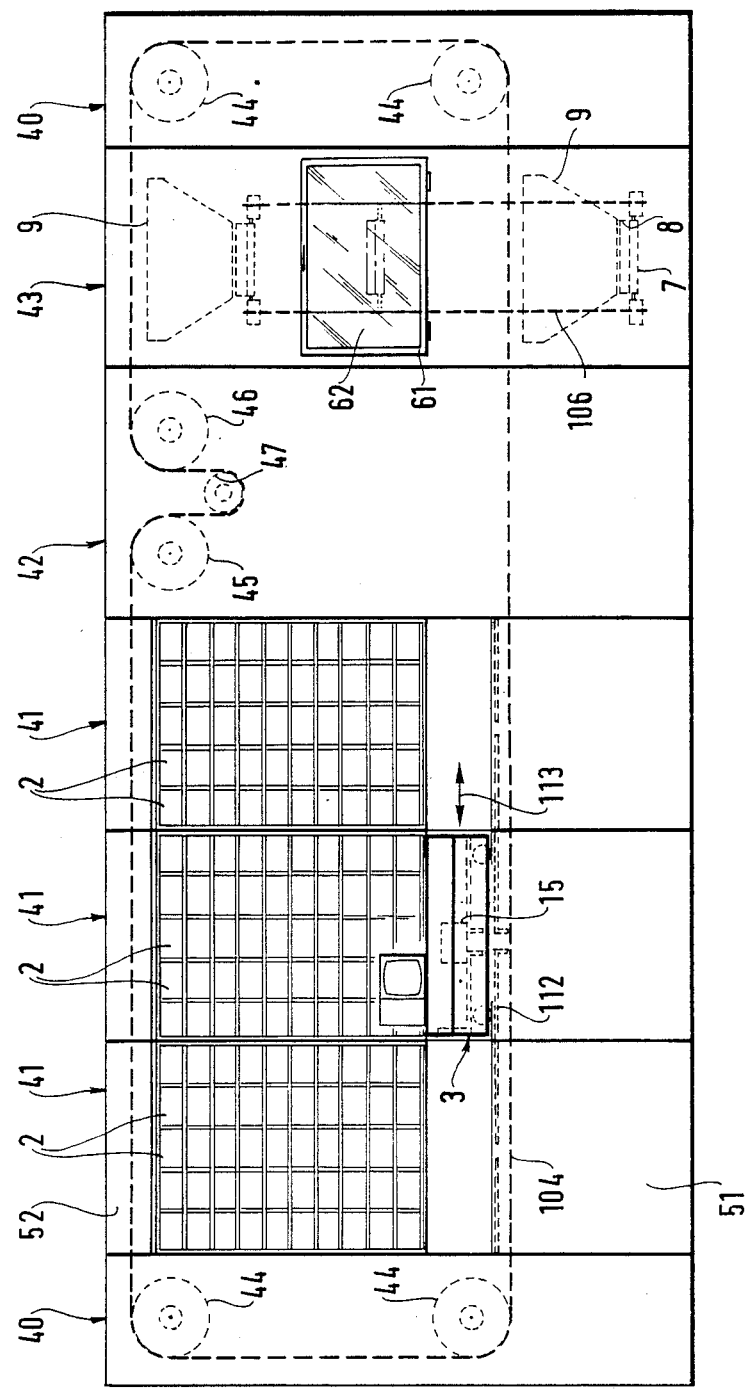
FIG. 8 is an elevation view of a rectilinear installation.

FIG. 8 is an elevation view of a rectilinearly configured installation. Its component parts have the same reference numerals as are used in FIGS. 2 and 3, and varying numbers of the same component parts are used in installations having different configurations.

The installation shown in FIG. 8 comprises three storage modules 41 of the drawer type and each designated by the same reference 2 as is used in FIG. 1, together with a single sorting module 43. The tensioning and drive module 42 is located between the storage modules and the sorting module, and the ends of the installation are constituted by respective terminal modules 40.

The delivery conveyor is referenced 104 and the sorting conveyor is referenced 106. Two transfer members 9 are provided to perform transfers from the delivery conveyor to the sorting conveyor within the sorting module 43. The desk 3 movable in either direction as shown by double-headed arrow 113 in front of the three storage modules 41 along its guide path 112 serves to inject medicines after they have been taken from one or other of the drawers 2 onto the delivery conveyor 104 where it passes beneath the desk.

The wheels engaging the delivery conveyor or the sorting conveyor, as the case may be, in the terminal modules 40, in the tensioning and drive module 42, and in the sorting module 43 have the same references in FIG. 8 as in FIG. 3. They are not described in further detail with reference to FIG. 8.

The storage modules 41 used in the installation are identical to one another. One of these storage modules is described below with reference to FIG. 8 and to FIG. 9 which is a side view thereof, showing the storage module 41 with the moving desk 3 placed in front of it.

Each of the storage modules 41 is generally in the form of a piece of furniture or a chest of drawers 50 firmly mounted on the ground by means of a base 51 which projects forwardly, and having an overhanging cornice 52 projecting from the top of its front face. The cornice 52 encloses a first guide path 53 for one of the horizontal lengths of the delivery conveyor 104 having buckets designated by reference 5 in FIG. 1. Another guide path 54 is provided for the other horizontal length of the conveyor 104 and its buckets 5 on top of the projecting portion of the base 51 in a support structure 55 which is fixed thereto.

The front of the support structure 55 includes first guide means 56 for the desk 3. Second guide means 57 for the desk are associated therewith and are at least partially received inside the front face of the chest 50, above the projecting base 51. These first and second guide means are rails and the desk is supported and guided by wheels which run the rails. The rails and the wheels are not individually referenced in FIG. 9, however they are visible therein.

Only the portion of the storage module situated above the desk 3 and beneath the cornice 52 is used for storing medicines and is equipped with storage drawers 2.

In this portion, the drawers 2 advantageously slope down towards the operator, as shown in FIG. 9, i.e. down towards the front of the installation. This sloping disposition provides free access at 58 into each of the drawers between their front edges and the risers and cross-pieces which separate the drawers from one another. This sloping disposition also makes it possible to grasp each drawer by using its front edge in order to open the drawer more fully to take medicines out therefrom or to fill it up with medicines. Further, the slope naturally causes medicines to accumulate towards the front of each drawer.

With reference to FIG. 9 in particular, it can be seen how the storage modules 41 having drawers are pre-equipped with the cornice 52 and the support structure 55 which define the horizontal paths 53 and 54 for the delivery conveyor. The cornice 52 and the support structure 55 may alternatively be applied to the storage modules after they have been installed.

The rails of the guide means 56 and 57 for the desk 3 are applied to the storage modules after they have been disposed in an installation, in order to ensure that the rails are continuous.

It can also be seen, in FIG. 9, that the desk 3 which does not belong to any specific one of the storage modules in front of which it runs is equipped with means for injecting unit medicines into the buckets 5 of the delivery conveyor 104. These injection means are mounted in the housing of the desk. They are designated in a general manner in FIG. 9 by the same reference 15 as is used for the trap door representing them in FIG. 1.

Arrows 30, 31, and 32 marked in FIG. 9 correspond to the arrows having the same reference numerals in FIG. 1 and represent operations performed between the storage module and the desk, and in particular they represent the operation of taking medicines from one of the drawers 2, the operation of passing a medicine past the code reader and into the injector means 15, and the operation of injecting the medicine into one of the buckets of the delivery conveyor as it is driven under the desk.

The sorting module 43 in this installation is described with reference to FIG. 8 and to FIG. 10 which is a section through the sorting module.

It is in the form of a rectangular box 60 having the same height as the above-described storage modules and of the same depth or of slightly greater depth than the forwardly-projecting bases thereof.

The box 60 has a window 61 in its front face, which window is closable by means of a fold-down flap 62 which constitutes a work surface at the front of the sorting module, as shown in FIG. 10. The patient packs 8 or the trays 7 in which they are received are identified by the device 28 shown in FIG. 1 at this window 61. The device 28 may be simply a light pen and is not shown in FIGS. 8 and 10. The box has two pairs of openings 63 and 64 in its side walls level with the top cornice and level with the support structure on the base of the storage modules in order to pass the top and bottom lengths of the delivery conveyor 104 and its buckets 5 through the sorting module. The box houses the sorting conveyor 106 which is mounted at right angles to the delivery conveyor and which is supported by the walls of the box. The box also contains two transfer members 9 for transferring medicines from the buckets 5 of the delivery conveyor to the patient packs 8 disposed on the trays 7 of the sorting conveyor, with said references 7 to 9 being the same as the references 7 to 9 designating the same items in FIG. 1.

FIG. 10 uses the same references as are used in FIG. 3 to designate the three deflection wheels and the drive wheel for one of the two endless chains of the sorting conveyor (the other chain not being shown in the figure). These items are not described again. FIG. 10 also shows the same arrows with the same references as in FIG. 1 to indicate the various operations performed at the sorting module, namely:

arrows 22a and 22b showing the packs being put onto the trays of the sorting conveyor and showing them being removed therefrom, in both cases via the open window 61;

arrow 34 showing how a medicine is transferred from an upside-down bucket 5 into one of the transfer members 9; and an arrow 35 showing how a medicine is transferred from one of the transfer members 9 into a pack 8.

Further, double-headed arrow 21 shows that the sorting conveyor may be driven in either direction by the drive wheel 49 which is coupled to a motor (not shown) housed in the same sorting module as the conveyor.

FIGS. 11, 12, 13, and 14 show one of the above-described buckets 5 of the delivery conveyor 104 which is itself merely represented by dashed lines and is described in greater detail below. The bucket is semi-cylindrical in shape. It is advantageously made of plastic material. Its diameter may be about 80 mm, for example and its length may be 150 mm.

The bucket 5 is mounted on a support shaft 70 which is anchored substantially at the center of one of the semicircular end faces of the bucket. The support shaft 70 projects substantially axially away from the bucket. A toothed wheel 71 is fitted thereon adjacent to the bucket and is fixed relative thereto. Next to the wheel 71 there is a guide shoe 72 whose cross-section relative to the shaft 70 is square, and the shoe is also fixed to rotate with the supporting shaft 70. The shaft is mounted to rotate freely in a support part 73 which fixes the bucket to the delivery conveyor 104. A lever 73 is fixed to the free end portion of the support shaft 70 and carries a wheel 75 mounted free to rotate about a stub shaft 76 at its opposite end to the end fixed to the shaft 70.

The support part 73 for fixing the bucket to the conveyor 104 is rectangular in section. It has a projection 77 on its face opposite to the face which is fixed to the conveyor. The projection 77 extends parallel to the conveyor and its cross-section is semi-cylindrical.

This set of parts mounted on the shaft 70 serves to drive the bucket 5 and to keep it horizontal along all portions of the path of the conveyor 104 other than those portions occupying the transfer zones between the delivery conveyor and the sorting conveyor, as described below.

Further, the bucket 5 has a terminal finger 78 projecting from its semicircular side wall on which the support shaft 70 is mounted. The finger 78 is formed at the rear end of said wall, with rear being defined relative to the direction of bucket drive as indicated by arrow 20 in FIG. 1. The projecting finger 78 is used to provide coupling between the bucket and the door of the injector member for injecting a medicine from the desk, in a manner described below.

FIGS. 15 and 16 are an elevation view and a plan view respectively, both being in partial section and showing one of the trays 7 of the sorting conveyor and a pack 8 carried thereby. The section plane of FIG. 16 is marked XVI—XVI in FIG. 15. The tray is rectangular in shape having a relatively shallow upstanding peripheral rim. It is advantageously made of plastic material. The tray 7 comprises conventional adjustable wedging elements, (not shown) enabling it to adapt to the exact bottom dimensions of the packs inserted therein, so as to hold said packs securely thereon.

The top of each pack 8 is of slightly larger cross-section, thereby enabling the packs to be stacked with the bottom portions thereof being received in the top portions of the immediately adjacent packs. This reduces the volume required for storing empty packs when not in use. The packs 8 are advantageously made of plastic material. The maximum overall dimensions are about 350×200×120 mm. Although not shown, the packs may include a plurality of compartments, e.g. 2, 3, or 4 compartments.

The tray 7 is carried by two identical support shafts 80 which extend from either side thereof from its side rims. The tray is fixed to said shafts. Each of the shafts 80 has a guide shoe 81 adjacent to the tray and fixed to the shaft which is itself carried by a supporting part 82 for fixing the shaft to a corresponding one of the chains 106a and 106b of the two-chain sorting conveyor. The shafts 80 are free to rotate in said supporting parts 82. In addition, the free end of each shaft 80 carries a crank lever 83 having a wheel 84 mounted free to rotate about a stub shaft 85 at the end of the crank lever furthest from the shaft. The crank lever is mounted to rotate with the shaft.

Each support part 82 for fixing the tray to the sorting conveyor is rectangular in section. Its face opposite to that by which is fixed to the conveyor has a projection 86 in the form of a semicircular tooth extending across the width of the chain to which the part 82 is connected. The guide shoe 81 is square in section.

This arrangement of the tray ensures that it is driven by the two chains of the sorting conveyor while being kept horizontal over all parts of the path of the conveyor, as described below.

FIGS. 17, 18, 19, and 20 are various different views of the desk which is used as an injector station for injecting unit medicines into the buckets of the delivery conveyor. In these figures, the desk is given a general reference 3, while double-headed arrow 113 indicates the directions in which the desk may be moved one way or the other. General reference 5 designates the, or each, bucket and reference 104 designates the delivery conveyor carrying and driving the buckets, with these references being the same as those used in FIG. 9.

Figure 17:
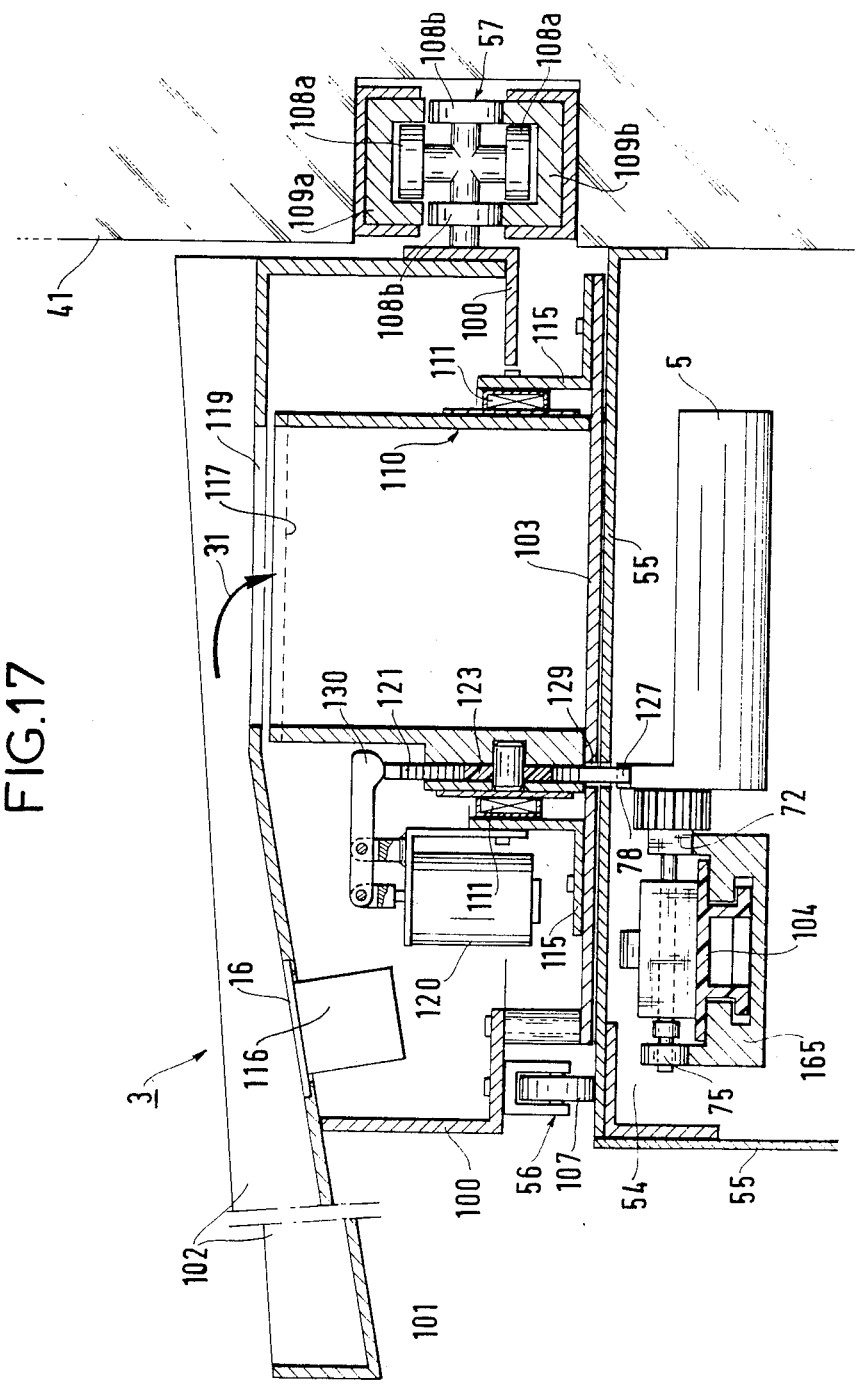
FIG. 17 is a section through a desk forming the item injection station in the installation shown in FIG. 1 or 8, the section being taken on a plane XVII—XVII of FIG. 18.

FIG. 17 is a cross-section in a vertical plane through a storage module 41 and the desk located in front of it, and it can be seen that the desk includes a main frame 100 made of angle bars. The frame 100 carries a bar 101 defining the top or working surface of the desk. This working surface slopes downwardly slightly towards the front of the installation and is terminated by a raised front edge. The sloping work surface also has two upstanding sides 102.

Figure 18:
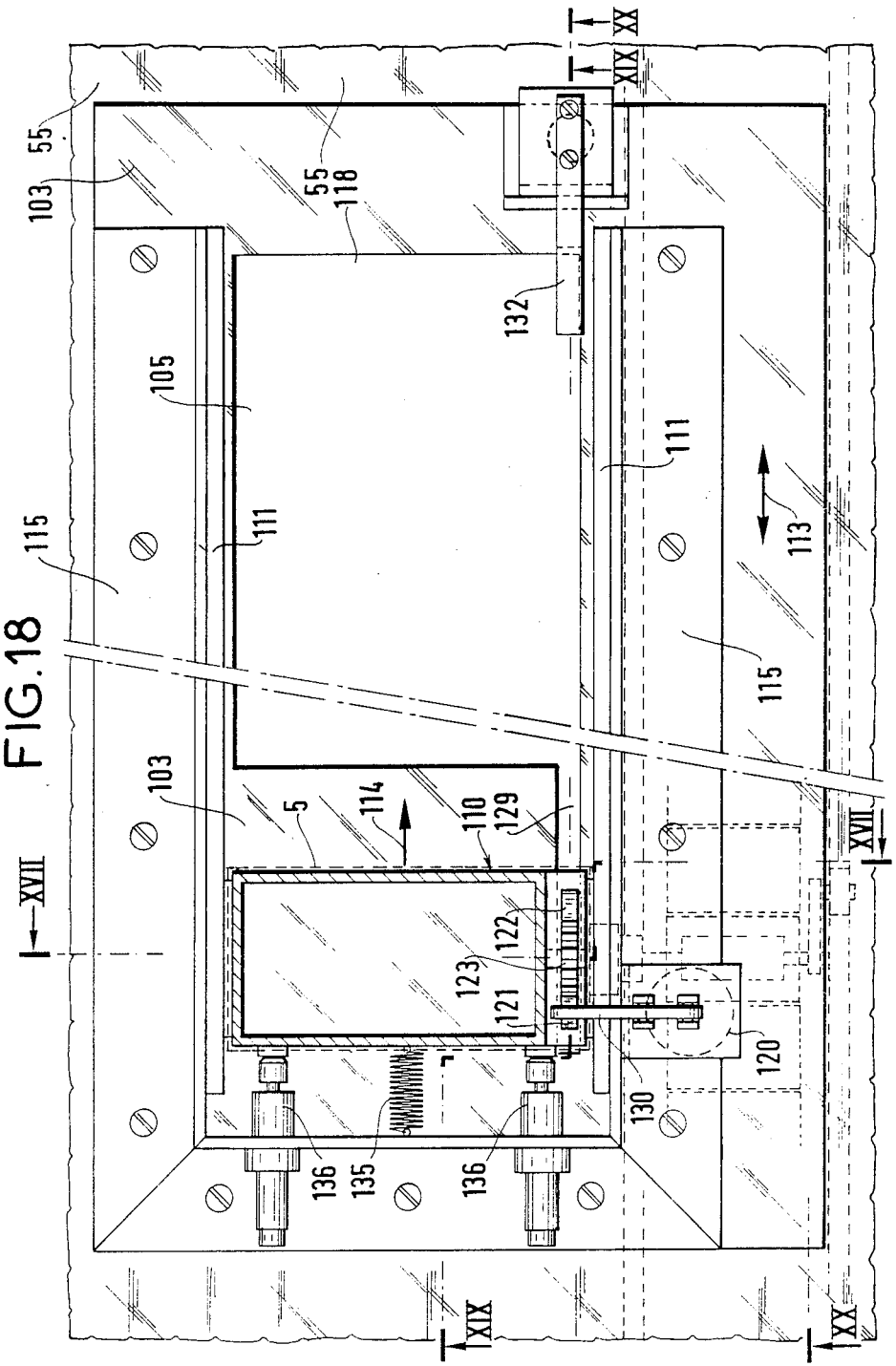
FIG. 18 is a fragmentary plan view of the desk shown in FIG. 17 in section on a plane XVIII—XVIII in FIG. 19.
Figure 19:
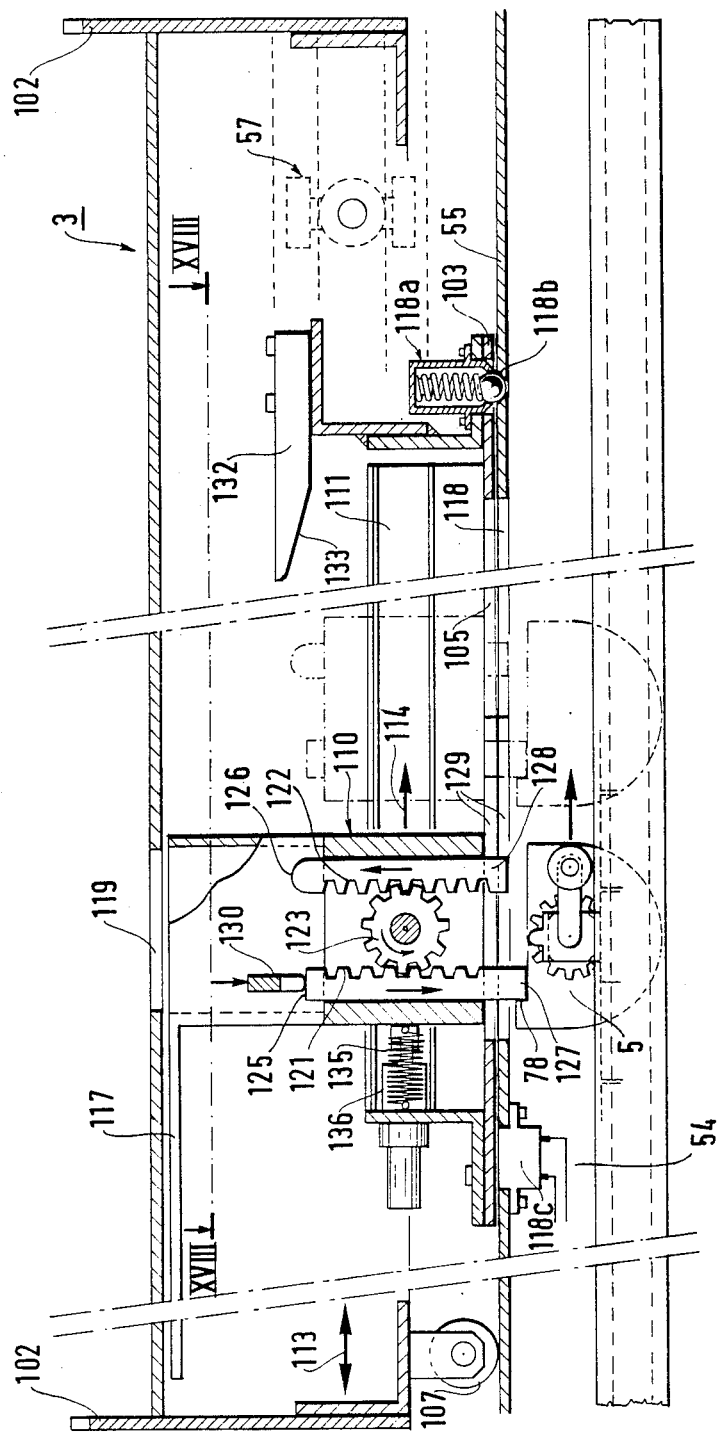
FIGS. 19 and 20 are section views on planes XIX—XIX and XX—XX of FIG. 18 showing how the desk operates.
Figure 20:
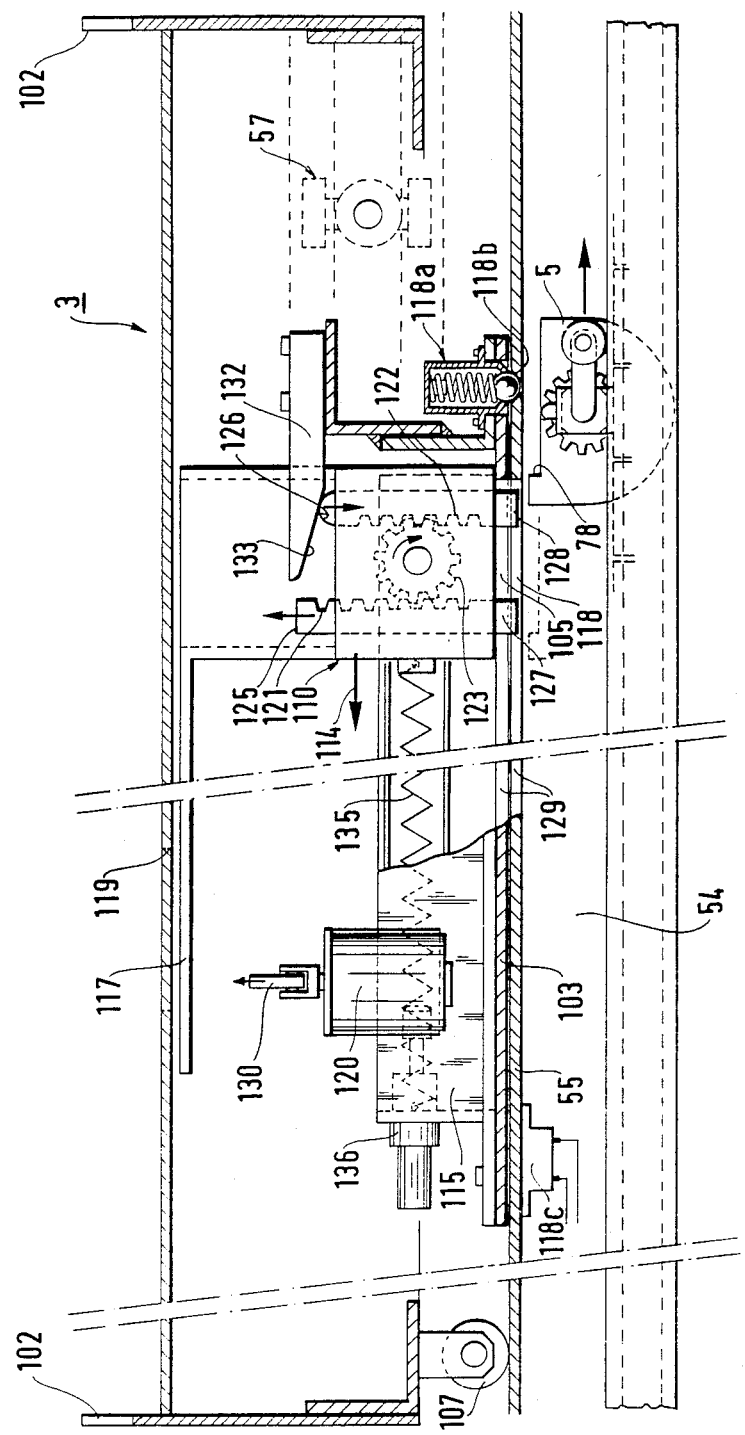

The bottom of the desk is closed by a base plate 103 with a large hole 105 therethrough (see FIGS. 18, 19, and 20).

The frame also carries the wheels belonging to the desk guide means and generally referenced 56 and 57, as in FIG. 9. Thus, a front wheel 107 mounted beneath the front portion of the frame 100 is guided and free to rotate on the end portion of the horizontal top surface of the support assembly 55 carried by the forwardly projecting base of the storage module 41. Two orthogonally coupled pairs of wheels 108a and 108b are mounted behind the rear portion of the frame 100. The two wheels 108a are held captive inside respective facing channel section rails 109a and 109b and bear against the inside surfaces of the rail's channel section flanges, with the other two wheels 108b being located between the facing edges of the flanges of both rails. The rails 109a and 109b are fixed in a slot in the front face of module 41 and run along the entire length of the set of modules 41. When the desk is moved past the set of storage modules, its bottom plate 103 thus slides without friction over the horizontal top surface of the support assembly 55.

The desk 3 is fitted with means for identifying the unit medicines to be injected onto the delivery conveyor 104. Beneath its working surface 101, it has a code reader 116 mounted beneath the read window, which is referenced 16 as in FIG. 1.

The desk 3 is also equipped on its inside with means for suitably injecting unit medicines into successive buckets arriving therebeneath, as these buckets are driven along the guide path 54 defined by the support assembly 55.

In FIG. 17 and in FIG. 18 (where FIG. 18 is a plan view of the desk with its working surface 101 partially cut away) it can be seen that the desk includes an inside drawer 110. The drawer is mounted above the bottom plate 103 towards the back of the desk and beyond the code reader 116 for detecting the identification code of a medicine prior to the medicine being received by the injector member. The drawer is carried on two telescopic slides 111 and is movable in translation thereon in the direction of arrow 114 parallel to the double-headed arrow 113 representing the displacement of the desk past the fronts of the storage modules of the installation. The slides 111 are carried by two angle bar supports 115 which are fixed to the base plate. They receive wheels or the like (not referenced) mounted on the side walls which engage the drawer.

The drawer 110 has an open bottom (not referenced) and rests directly over the bottom plate 103 having the opening 105. A small amount of play is provided. The top of the drawer is also open and it carries a side flap 117 extending forwardly beneath the working surface 101 of the desk. The drawer can occupy two possible limit positions on the slides 111; one of these positions being a medicine-reception position and the other being a position for injecting medicine into a bucket 5, and these two positions corresponding substantially the two end-of-stroke positions of the drawer. In its medicine-receiving position, as shown in FIG. 19, the drawer lies beneath an opening 119 provided through the top surface of the desk. In its position for injecting a medicine into a bucket 5 passing beneath the desk, as shown in FIG. 20, the drawer is situated at the end of the opening 105 provided through the bottom plate 103 of the desk and corresponding to a similar window 118 provided through the top surface of the support assembly 55. In an intermediate position between the reception position and the injection position, the bottom of the drawer is already open over the windows 105 and 118, with the lengths of the windows increasing the length of time available for transferring a medicine into a bucket 5.

The bottom plate 103 is advantageously ribbed and swept by small brushes carried on the edge of the drawer so as to prevent a medicine jamming between the drawer and the bottom plate as the drawer moves thereover. Once the drawer has left its reception position, the opening 119 is completely closed by the side flap 117 fixed to the drawer.

The window 118 shown in the support assembly corresponds to the storage module 41 in front of which the desk has been positioned. In the installation, the various different storage modules have windows analogous to the window 118, or else only a portion of the storage modules have such windows. These windows correspond to the different positions in which the desk may be stopped in front of the storage bay of the installation. In each of these possible stopping positions, the desk is locked in place by a mechanism 118a including a ball which is resiliently mounted on the desk and which is urged towards the structure 55, with each of the windows 118 having a ball-receiving recess 118b. A contactor 118c mounted between the structure 55 and the desk 3 serves to detect the locked position of the desk in each of its different possible positions. These arrangements are best seen in FIG. 19.

The movement of the drawer in translation is described with reference to FIGS. 17 to 20. The drawer is driven under the control of an electromagnet 120 which is housed in the desk close to the drawer when the drawer is in its medicine-receiving position. The side wall of the drawer closest to the electromagnet 120 has two racks 121 and 122 mounted transversely to the slides for the purpose of driving the drawer. These racks face each other and are coupled to each other by a toothed wheel 123. The toothed wheel 123 is mounted free to rotate on said side wall of the drawer. It drives the two racks in opposite vertical directions relative to the drawer.

With reference to FIGS. 19 and 20, in particular, it can be seen that the ends of both of the racks 121 and 122 project beyond the side wall of the drawer on which they are mounted, with the rack referenced 121 being slightly longer than the other rack referenced 122.

The top end of the rack 121 forms a flat head 125. The top end of the other rack 122 forms a round head 126. The bottom end of the rack 121 has a latch 127 which projects to a greater or lesser extent into the bucket guide path 54 through the support assembly 55 and is positioned facing the bucket path. The bottom end of the rack 122 referenced 128 projects to a greater or lesser extent from the bottom plate 103 of the desk without actually projecting into the support assembly 55.

The bottom ends of both racks pass through the bottom plate 103 of the desk and the top bar of the support assembly 55, which are provided with slots 129 to allow said bottom ends to pass along the full length of the possible path of the desk.

A pivot lever 130 has one of its ends hinged to the armature of the electromagnet 120.

The lever projects towards the drawer. Its opposite end has a substantially semicircular bottom surface and constitutes a control end extending above the top end 125 of the rack 121 when the electromagnet is not activated.

When the electromagnet is activated, the control end of the pivot lever 130 presses against the head 125 and causes the rack 121 to slide downwardly, thereby causing said rack to occupy its low position relative to the drawer. Simultaneously with the rack 121 being pushed downwardly, the other rack 122 is raised to its high position relative to the drawer. When the rack 121 is in its low position, its latch 127 projects well into the support assembly on the path 54 of the buckets 5, and more particularly on the path of the projecting fingers 78 on each of the buckets. When the rack 121 is in this low position, any bucket passing beneath the drawer engages the latch 127 by means of its finger 78 and thus drives the drawer from its medicine-receiving position to its position for injecting the medicine into said bucket.

A fixed cleat 132 mounted at the end of the stroke of the drawer along its slides as the drawer moves into its position for injecting the medicine into the bucket serves to disconnect the drawer 110 from the bucket 5 which has been used to move the drawer. The cleat 132 extends parallel to the slide 111 and faces the side wall of the drawer having the racks mounted thereon. It is located on the path of the rounded top head 126 of the rack 122 when in its high position. The bottom surface of the cleat slopes so as to constitute a descending camming surface 133 for the rounded head 126 as the drawer moves into its final injection position. Towards the end of the stroke of the drawer, the head 126 of the rack 122 engages under the slope 133. The rack 122 is then returned to its low position on the drawer with its bottom end always remaining higher than the upwardly-projecting finger on the bucket in order to avoid further engagement therewith. Simultaneously and by virtue of the coupling provided between the racks by the toothed wheel 23, the other rack 121 moves to its high position, thereby withdrawing its latch 127 and releasing the projecting finger on the bucket thus disconnecting the drawer and the bucket.

A spring 135 is mounted between the drawer and the desk and extends parallel to the slides. The spring 135 is tensioned as the drawer moves from its medicine-receiving position to its position for injecting medicine into a bucket. This spring therefore returns the drawer to its medicine-receiving position as soon as the latch 127 has escaped from the upwardly-projecting finger 78 on the bucket. Two shock absorbers 136 placed on either side of the spring 135 ensure that the drawer stops properly in its medicine-receiving position.

For this operation of the medicine injecting station as formed by the desk, with unit medicines being injected into various buckets, the electromagnet 120 receives its activation control signal from the code reader 116 mounted in the desk beneath the read window 16 and also from the central control unit 10. This activation control signal is given when the medicine identity detected by the code reader 116 matches one of the varieties of medicine currently being processed as defined by the control unit of the installation, and when the bucket arriving beneath the drawer is empty. The various arrows in FIGS. 17 to 20 match those marked on FIGS. 1 and 8 and indicate how the injection station operates.

Figure 21:
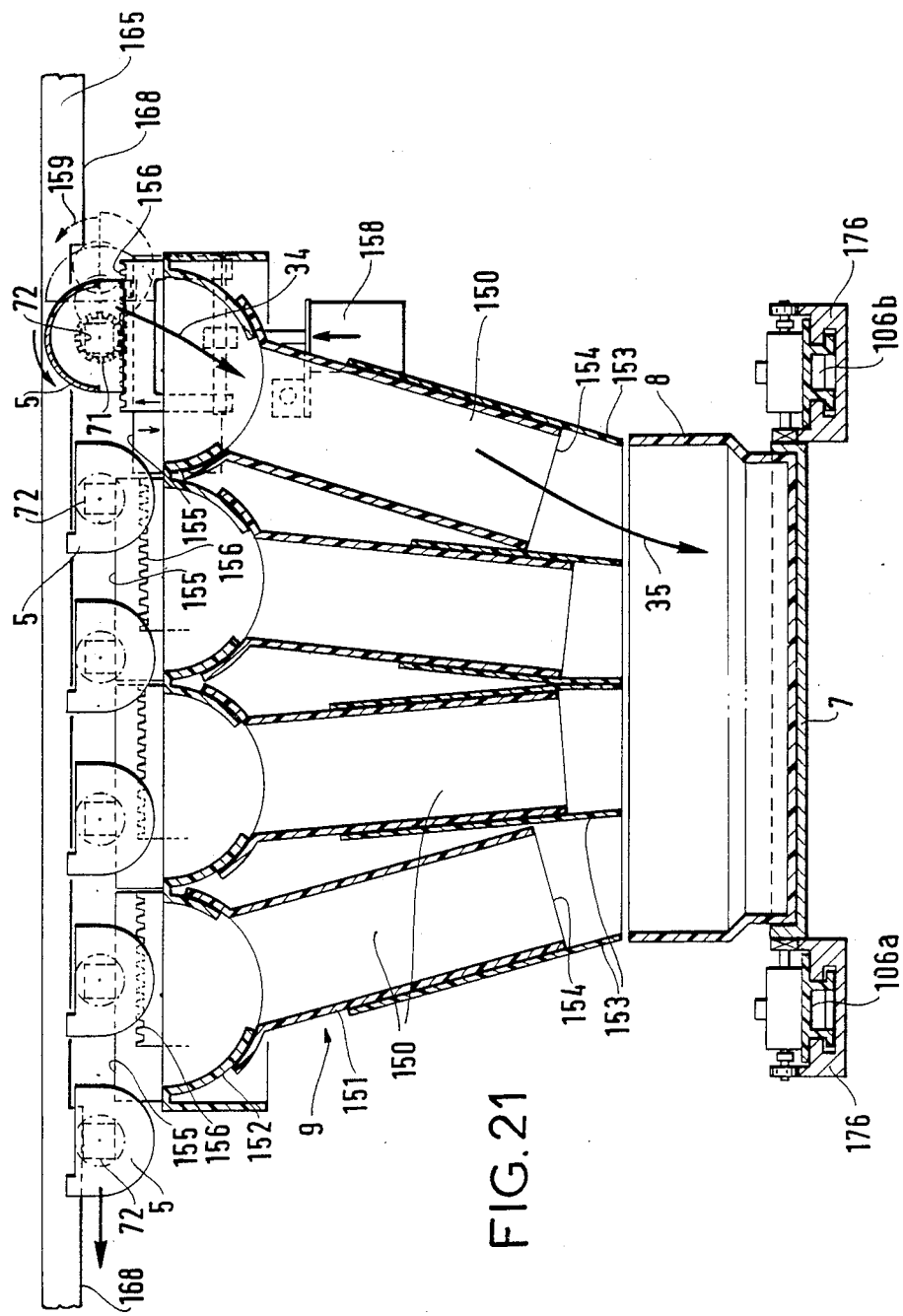
FIG. 21 is a diagrammatic section view through one of the transfer members between the delivery conveyor and the sorting conveyor, as used in an installation as shown in FIG. 1 or 8.

FIGS. 21, 22, and 23 are fragmentary section and elevation views of one of the transfer members shown in FIGS. 8 and 10, with the elevation views of FIGS. 22 and 23 showing, in particular, how the transfer member is associated with the delivery conveyor and its buckets, respectively when a medicine is not transferred from the bucket and when a medicine is transferred. The various items shown in these figures have the same references as they do in FIGS. 8 and 10.

The transfer member 9 is mounted beneath the path of the buckets 5 of the delivery conveyor 104 and above the path of the patient packs 8 carried by the trays 7 of the sorting conveyor having two chains 106a and 106b.

The transfer member 9 is in the form of a module of rectangular section and is fixed inside the corresponding sorting module. The transfer member 9 comprises a plurality of individual transfer hoppers 150 which may correspond to a corresponding number of compartments (not shown) in the packs. Each of these hoppers is constituted by a duct 151 whose top end is capped by a medicine-receiving funnel 152 and whose bottom end is extended by a skirt 153 delimiting the outlets from the hoppers.

It can be seen in FIG. 21 that the individual hoppers 150 are four in number, are disposed side-by-side parallel to the delivery conveyor 104 and transversely relative to the sorting conveyor 106a–106b so as to transfer a medicine from one of the buckets to the patient pack located beneath the transfer member.

These individual hoppers slope relative to the central vertical axis of the transfer member with the outer hoppers sloping more than the inner hoppers. This disposition allows the top medicine-receiving funnels 152 to be at a pitch which is greater than that between the funnel outlets, with the set of said outlets being arranged to match the length of each pack.

The medicine-receiving funnels 152 flare towards the buckets, they are shown as being hemispherical and their diameters are greater than the diameters of the semi-cylindrical buckets 5.

The bottoms of the funnels 152 open out to respective ducts 151. The funnels are advantageously obtained as a single piece which fits on the flared top ends of the ducts and the assembly is held together by conventional mechanical means known to the person skilled in the art and not shown.

The bottom skirts 153 delimiting the outlets from the hoppers are suitable for fitting to the bottoms of the ducts 151. They enable the vertical height of the hoppers to be adjusted as a function of the distance between the delivery conveyor and the sorting conveyor or as a function of the heights of the packs, so that the outlets from the hoppers open out immediately above the packs. Suitable mechanical dispositions known to the person skilled in the art and not shown serve to hold the adjustable skirts in place.

The bottom end of each duct 151 is closed by a controllable hatch 154. The hatches 154 serve to temporarily retain a medicine received in the corresponding hopper for the length of time necessary for the appropriate pack to be positioned underneath the transfer member 9. These hatches are individually controlled by respective electromagnets or the like (not shown) under the direct control of the central control means 10 of the installation (see FIG. 1) and details of the hatches and their control means are well known to the person skilled in the art, and are therefore not shown.

The large side face of the transfer member 9 which extends between the path of the buckets 5 and the associated delivery conveyor 104 carries a mechanism for transferring medicine from one of the buckets 5 to one of the hoppers 150. Each hopper has one such mechanism associated therewith and each mechanism comprises a slide 155, a rack 156, a pivoting lever 157 connected both to the slide 155 and to the rack 156, with the connections thereto being on either side of its pivot point, and an electromagnet 158 for actuating the lever 157 and having its armature pivoted to one of the ends of the lever.

In each of these mechanisms corresponding to the various hoppers 150, the slide 155 is mounted level with the path of the guide shoe 72 fixed on the support shaft 70 of each bucket, while the rack 156 is level with the path of the toothed wheel 71 likewise fixed on the support shaft 70 of each bucket (see FIGS. 11 to 14). The slide and the rack are actuated in translation in opposite directions by the pivot lever 157 which couples them together, and this is indicated by arrows 155a & 156a and 155b & 156b on FIGS. 22 and 23 showing that whenever one of them is retracted away from the corresponding item on the shaft 70 of each bucket, then the other of them is engaged with the corresponding item on the shaft 70 of the same bucket. Thus, with reference to FIG. 22, and assuming that no medicine is to be transferred from the bucket 5 into the individual hopper 150 over which it is passing, the electromagnet 158 acts in the direction indicated by arrow 158a to pivot the lever 157 so that the slide 155 is in its high position and the shoe 72 bears thereagainst. Simultaneously the rack 156 is thus in its low position and is retracted away from the toothed wheel 71. Otherwise, and with reference to FIG. 23, when medicine is to be transferred from the bucket into the hopper shown, the electromagnet 158 acts in the direction of arrow 158b on the pivoting lever 157, thereby lowering the slide 155 so that it is retracted away from the shoe 72, thus allowing the bucket to rotate, while simultaneously raising the rack 156 to its high position so that it engages the toothed wheel 71 and drives it, thereby rotating not only the toothed wheel 71, but also the support shaft 70 and the bucket 5.

By tipping the bucket upside-down as shown by arrow 159 over one of the hoppers, the medicine which it contained is transferred into said hopper.

Although the successive racks 156 belonging to different hoppers are disjoint and avoid any of the buckets from turning over at the ends of their passages over one or other of the hoppers, the successive slides 155 are substantially contiguous, as shown in FIG. 21. The length of each rack and the diameter of the toothed wheels 71 are designed so as to ensure that the toothed wheel rotates through a full turn thereby rotating the bucket through a full turn over the corresponding hopper. The electromagnet 158 actuating the transfer mechanism for transfer into an appropriate one of the hoppers is controlled by the central control unit 10 of the installation (FIG. 1) when it predicts a possible coincidence at the transfer member between the bucket containing a medicine and the pack which is to receive it.

In FIGS. 21, 22, and 23, arrows representing the operations whereby a medicine is transferred from the delivery conveyor to the sorting conveyor have the same references as are used in FIG. 10. Thus, arrow 34 represents transfer of the medicine from the bucket 5 turned upside-down at the hopper beneath the bucket. Arrow 35 represents the medicine being injected into the pack beneath said hopper, with said injection being optionally delayed by temporarily storing the medicine in the hopper.

Figure 24:
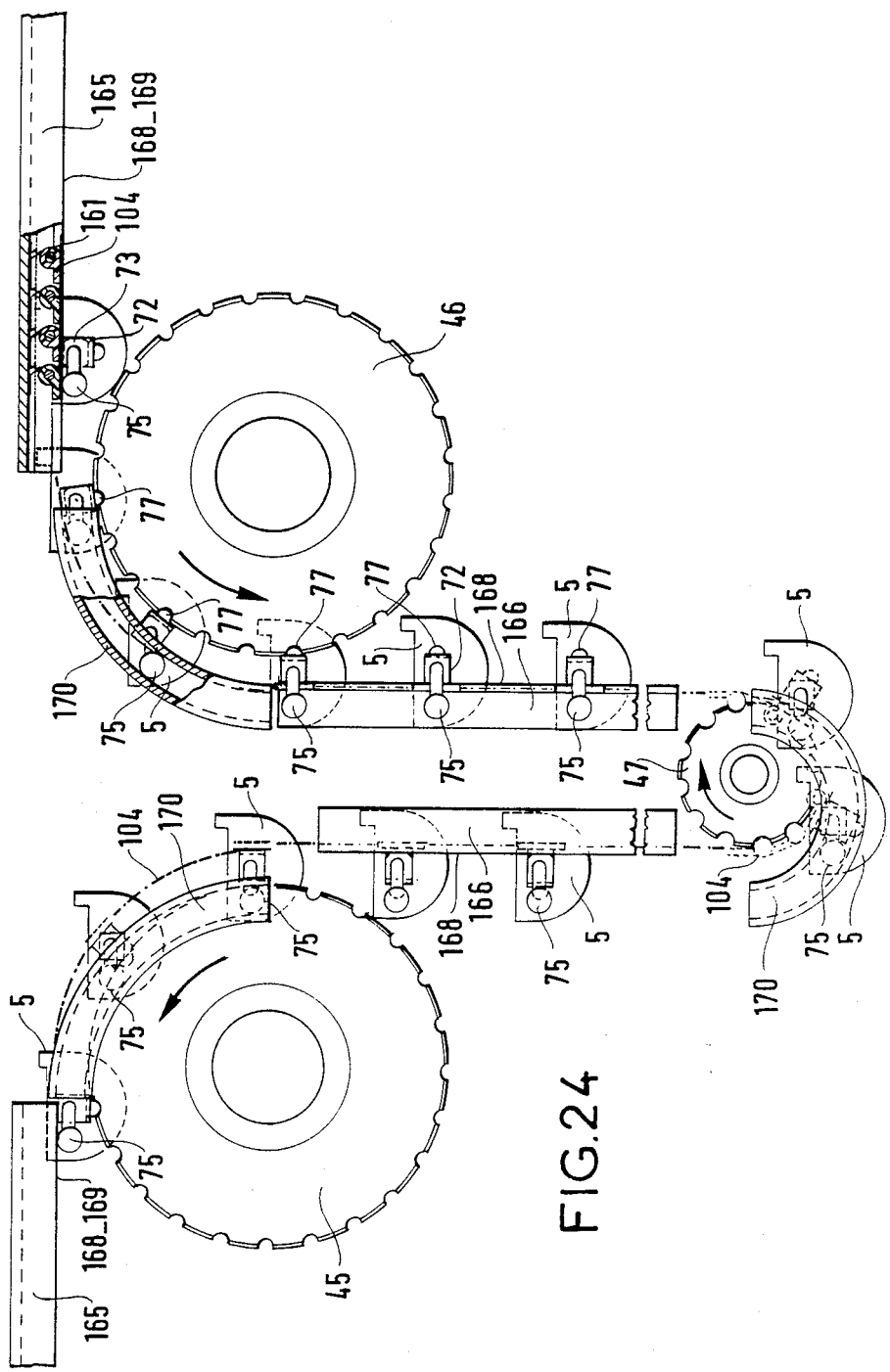
FIG. 24 is an elevation view of the delivery bucket conveyor in an installation in accordance with the invention, and in particular showing linear and curved portions of the conveyor path.

FIG. 24 is a fragmentary elevation view showing the buckets 5 on the delivery conveyor 104 and how they are held horizontal over their entire path other than those portions where they may be turned upside-down over the transfer zones, as described with reference to FIGS. 20 to 23. This fragmentary view shows a portion of the top length of the conveyor inside the drive and tensioning member 42 shown in FIG. 8. This FIG. 24 is described with reference also to FIGS. 11 and 12 relating to one of the buckets 5 shown associated with the delivery conveyor (in dashed lines) shown in a position appropriate to a portion of the bottom length of the conveyor.

The delivery conveyor 104 is of the caterpillar type comprising an endless loop of successive solid links 160 (see FIG. 12) which are hinged to one another about assembly axes 161 (see FIG. 24). This configuration gives the conveyor adequate flexibility for all portions of its path, and in particular for the curved portions. One of the faces of each link, and thus one of the faces of the conveyor as a whole, is smooth, and in this example it is the inside face of the conveyor loop which is smooth. The support parts 73 for fixing the various buckets are fixed to said smooth face with each support part being fixed to a corresponding one of the links, and with the various support parts being at the desired pitch for the buckets. The other face of the conveyor, in this case the outer face, has teeth (see FIG. 11). It has assembly lugs 162 of semicircular cross-section and extending across the conveyor, with the hinge axis between successive links passing through said lugs, and guide lugs 163 constituted by L-shaped members running along the sides of each link with the shorter legs of the L-shapes projecting outwardly from the conveyor.

The linear portions of the conveyor 104 are received in horizontal and vertical rails 165 and 166 which are disposed on the outside face of the conveyor path. Each of these rails is substantially in the form of a channel section member with grooves 165 running along the base inside edges of its flanges to receive the guide lugs 163 on the links of the conveyor (see FIG. 11). The upper horizontal portion of the conveyor 104 thus appears to be "suspended" from its horizontal rail whereas the bottom horizontal portion appears to be resting on its rail.

Figure 11:
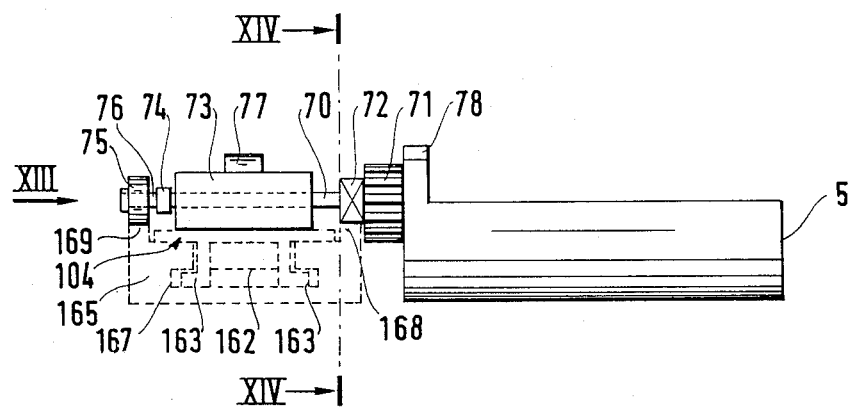
FIGS. 11 and 12 are an elevation view and a plan view of one of the buckets mounted on a delivery conveyor in the installation shown in FIG. 1 or 8.
Figure 12:
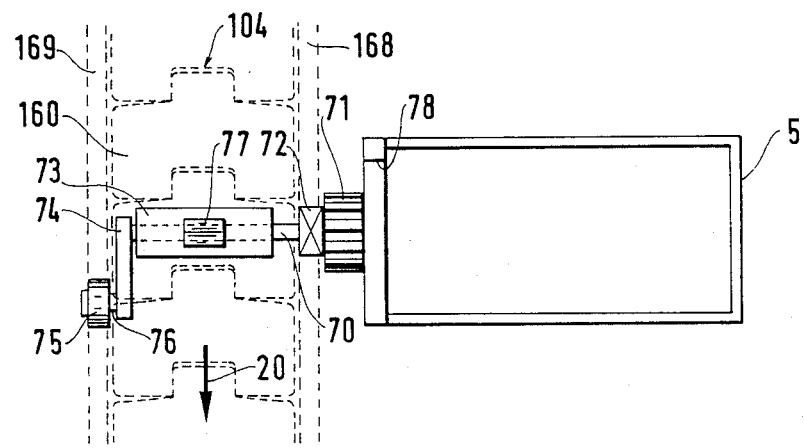
Figure 13:
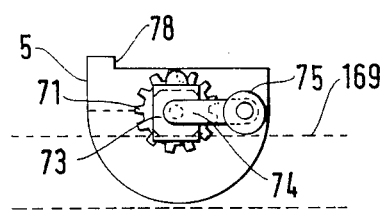
FIGS. 13 and 14 are end views of the bucket seen on lines XIII—XIII and XIV—XIV of FIG. 11.
Figure 14:
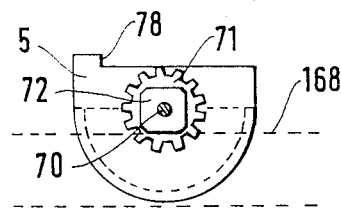

Apart from those zones facing the transfer members between the delivery conveyor and the sorting conveyor, the horizontal rails 165 of the delivery conveyor have guides 168 and 169 projecting from respective flanges of the rail in order to guide the guide shoe 72 mounted on the support shaft 70 of each bucket 5 and to guide the end wheels 75 mounted on the crank lever 76 likewise carried by said support shaft (see FIGS. 11 and 12). In zones facing the transfer members, these two side guides 168 and 169 are completely removed, as can be seen in FIGS. 22 and 23. The guide 168 for the shoe 72 is then replaced by the slide 155 which is no longer fixed to the rail but is fixed to the lever 157 which is coupled to the controlling electromagnet 158.

The vertical rails 166 are similar to the horizontal rails except insofar as the guide 169 for the wheel 75 is entirely missing. The vertical rails are therefore not described in greater detail.

In the curved portions of its path, the conveyor 104 engages toothed wheels disposed on the inside of the conveyor path. These wheels are drive wheels, deflection wheels, and tensioning wheels and they have the same references as given in FIG. 8, i.e. 45, 46, and 47. The semicircular projections 77 on the support parts 73 of the various buckets mesh in corresponding notches between the teeth of the wheels 45 to 47. An arcuate transition guide 170 outside the conveyor path is associated with each of the toothed wheels on the inside of the path in order to hold the buckets horizontally as they pass through the curved portions of the path. The transition guide is mounted to one side of the conveyor and is a channel section member which is open towards the conveyor in order to receive the wheel 75 mounted on the crank lever 74 fixed to the support shaft 70 of each bucket. The curve is chosen to ensure that the buckets are kept horizontal. As the shaft 70 rotates along said curved portion of the conveyor path, the transition guide ensures that the face of the guide shoe 72 which presses on the corresponding side guide of the horizontal rails is appropriately changed over from the inlet to the outlet of the transition guide.

Figure 25:
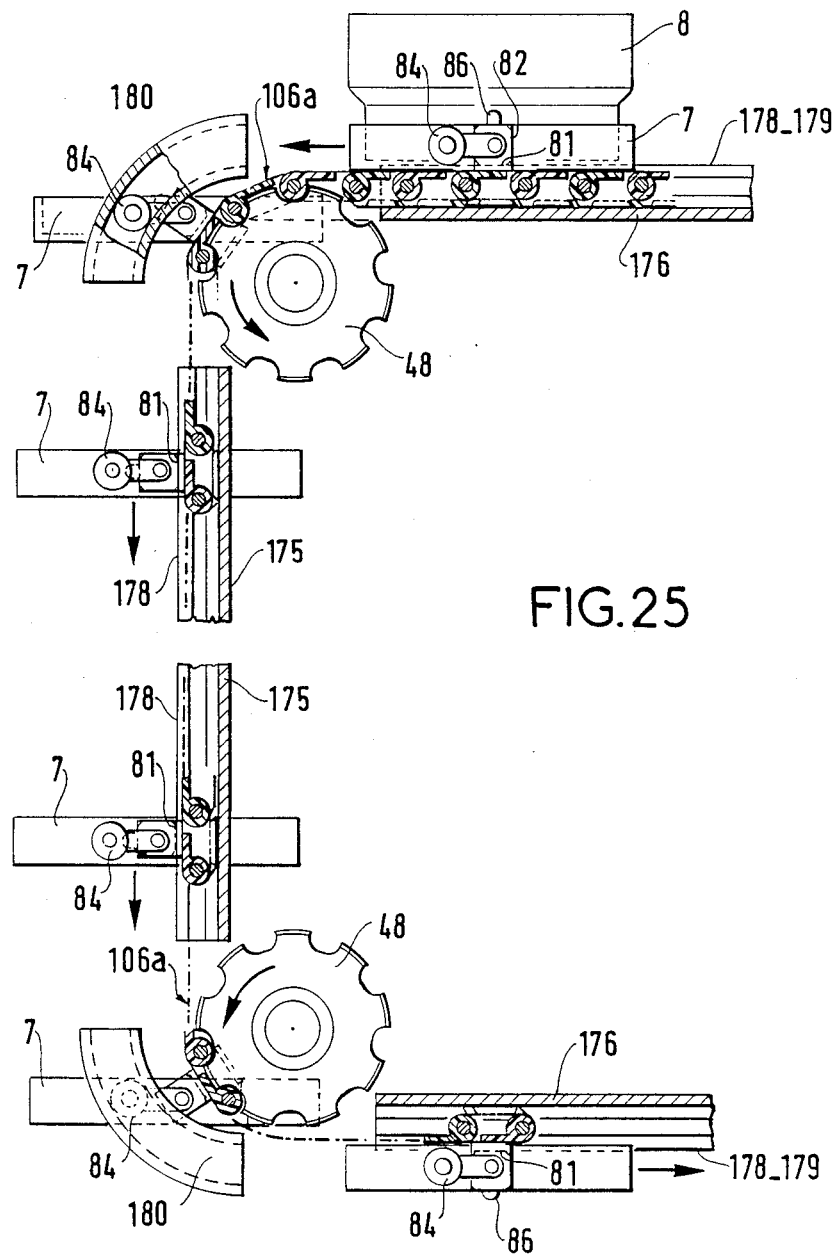
FIG. 25 is an elevation view of the sorting tray conveyor as used in, the installation, and shows in particular linear portions and curved portions of its path.
Figure 26:
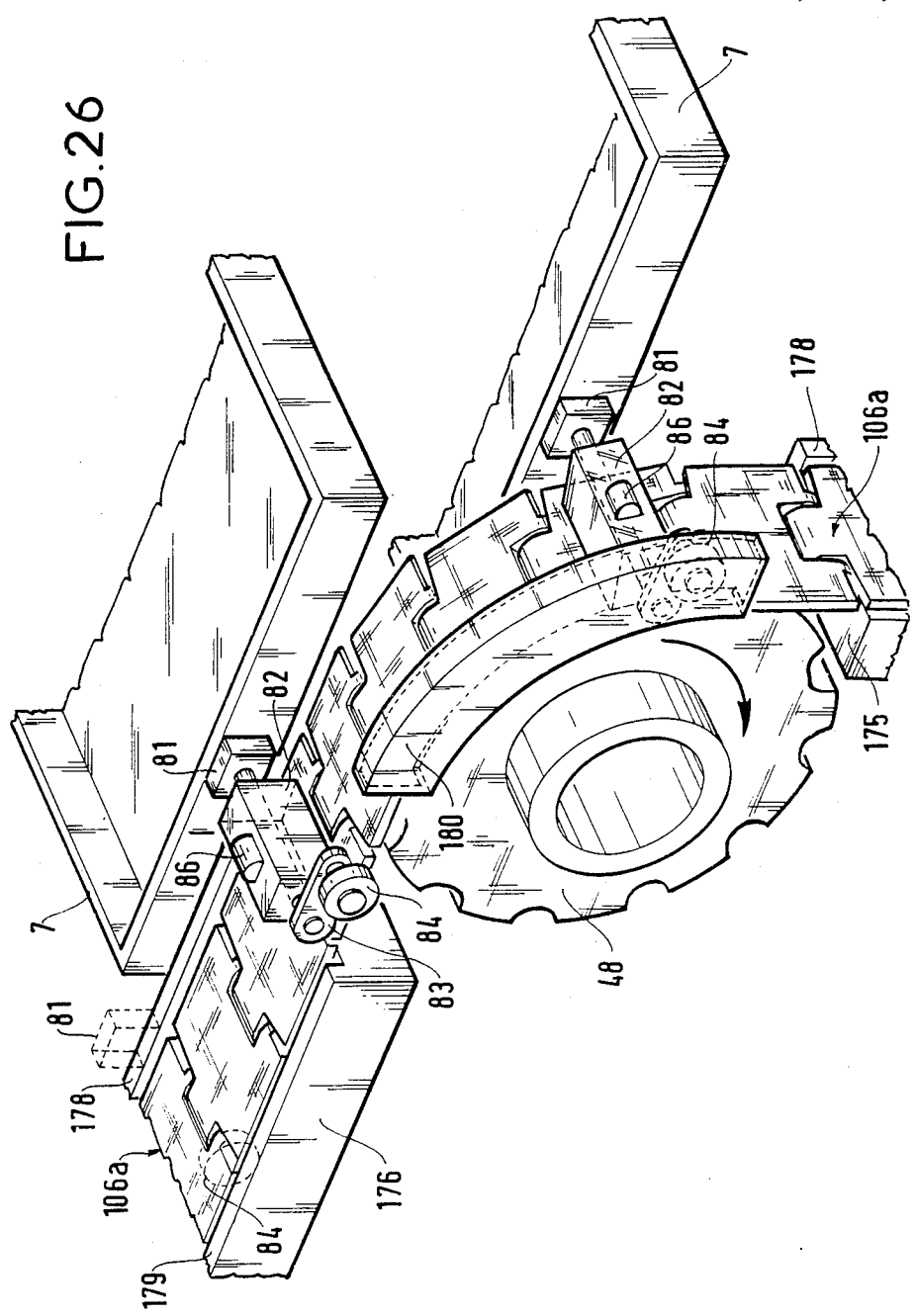
FIG. 26 is a fragmentary perspective view of the sorting tray conveyor.

FIGS. 25 and 26 are fragmentary elevation and perspective views showing how the trays are disposed on the sorting conveyor, which has two chain loops, with the figures showing both the linear portions and the curved portions of the sorting conveyor path. These figures show only one of the two sorting conveyor chains between which the pack-carrying trays 7 are mounted, namely the chain 106a, with the assembly being identical for the other chain. The description of FIGS. 25 and 26 is also made with reference to FIGS. 15 and 16 showing a tray and the associated conveyor chains 106a–106b in dashed lines, where FIGS. 15 and 16 both relate to the top horizontal portion of the sorting conveyor path, as do FIGS. 25 and 26.

Each of the chains such as 106a of the sorting conveyor is identical to the endless loop caterpillar type chain of the delivery conveyor. There is therefore no need to describe the chains such as 106a of the sorting conveyor in detail. The only difference is that in the sorting conveyor the smooth face of the chain 106a is disposed on the outside of the conveyor path (as is the smooth face of the other chain) and the notched face is therefore the inside face of the path.

The chain 106a of the conveyor has its horizontal and vertical portions received in respective horizontal and vertical rails 176 and 175 disposed on the inside of the sorting conveyor path.

These rails 175 and 176 are analogous to the corresponding rails 165 and 166 of the delivery conveyor. They are not described in further detail, except in that the horizontal rails have side guides 178 and 179 for the shoe 81 and the wheel 85 of the support shaft 8 on each side of the trays 7 while the vertical rails have only the guide 178 for the shoe 81.

In the curved portion of the chain 106a, it is the inside "notched" face of the chain which engages the toothed drive or deflection wheels located on the inside of the path, for example as referenced 48 in FIG. 10. The semicircular assembly lugs of the links in the chain mesh in corresponding teeth or notches in the wheels. An arcuate guide 180 disposed on the outside of the chain path keeps each of the trays horizontal as they pass through the curved portions of the sorting conveyor path. The guide 180 is analogous to the guide 170 described above. It receives the wheel 84 mounted on the end of the crank lever 83 which is constrained to rotate with the corresponding support arm 80 of the tray 7.

Figure 27:
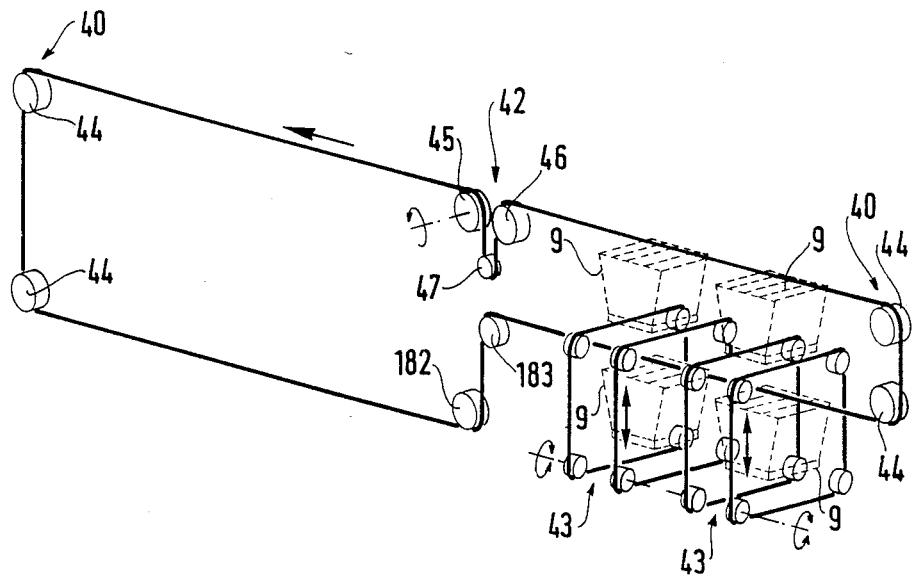
FIG. 27 is a diagrammatic view of the moving parts of an installation in a variant of the configuration shown in FIG. 3.

FIG. 27 is a perspective view showing the dynamics of a rectilinear configuration installation which is a variant on that shown in FIG. 3. In this variant, those elements which are identical or which correspond to elements in FIG. 3 are designated by the same references as are used in FIG. 3.

This variant shows that a rectilinear configuration installation can have its sorting modules 43 adapted in height as a function of the desired capacity of the installation.

In FIG. 27, the drive and tensioning module 42 includes two additional deflection wheels 182 and 183 for adapting the gap between the two horizontal lengths of the delivery conveyor 104 to the dimensions of the desired sorting modules 43. Additional wheel 182 is mounted on the inside of the conveyor path and engages the projections from the support parts of the buckets, as in FIG. 24, whereas additional wheel 183 is mounted on the outside of the conveyor path and therefore engages the assembly lugs between the links of the conveyor.

This same modification can also be performed in L-shaped or U-shaped installations.

The operation of an installation is controlled by the central control unit 10 shown in FIG. 1 on the basis of the data which it receives. In particular, it receives:

the identities of the patient packs inserted into the sorting module, thereby enabling the control unit 10 to keep track of the instantaneous position of each of the packs which correspond to different batches of medicines as it controls displacement of the sorting conveyor; and the position of the desk in front of the storage modules, the code of the medicine about to be injected into the delivery conveyor, and the code of the bucket which is to receive the medicine, thereby enabling the control unit 10 to keep track of the instantaneous position of each medicine on the delivery conveyor.

Advantageously, as mentioned when describing FIG. 1, the bucket code is detected at the injection point on the delivery conveyor which is as far downstream as possible. This limiting injection point is made to correspond to an origin position p0 for the buckets on the delivery conveyor, the position of each bucket is then incremented at the rate determined by the speed at which the conveyor moves them. It is also advantageous for the control unit to display the successive varieties of medicine required in an order corresponding to a one-way trip of the desk along the entire storage bay.

The origin position p0 and the desk position are known, as is the pitch and the sequence of the buckets on the delivery conveyor, the identity of un-emptied buckets which have been recycled and which reappear beneath the injection desk are known, and the control unit 10 permanently keeps track of the identity of the next bucket capable of having a medicine injected therein.

The instantaneous positions of the buckets on the delivery conveyor is advantageously expressed as a number of bucket pitch units, starting from the origin position p0.

In the control unit 10, a programmed assembly performs an algorithm for predicting the most favorable possible transfer between the buckets and one of the packs in one of the sorting modules at a time, preferably beginning with the first sorting module through which the buckets pass. This algorithm enables the control unit 10 to keep track of successive coincidences between the buckets and appropriate packs and to "designate" on a case-by-case basis that one of the packs which it is most advantageous to position under one of the two transfer members in the module. Once a pack has been designated, the control unit 10 causes the sorting conveyor to drive the designated pack into position under the appropriate transfer member.

This algorithm is initialized each time the following two conditions are satisfied:

the previously designated pack has received the, or each, medicine intended therefor; and the pack in the opposite position on the sorting conveyor from the previously designated pack has also received, where appropriate, the, or each, medicine intended therefor.

Figure 28:
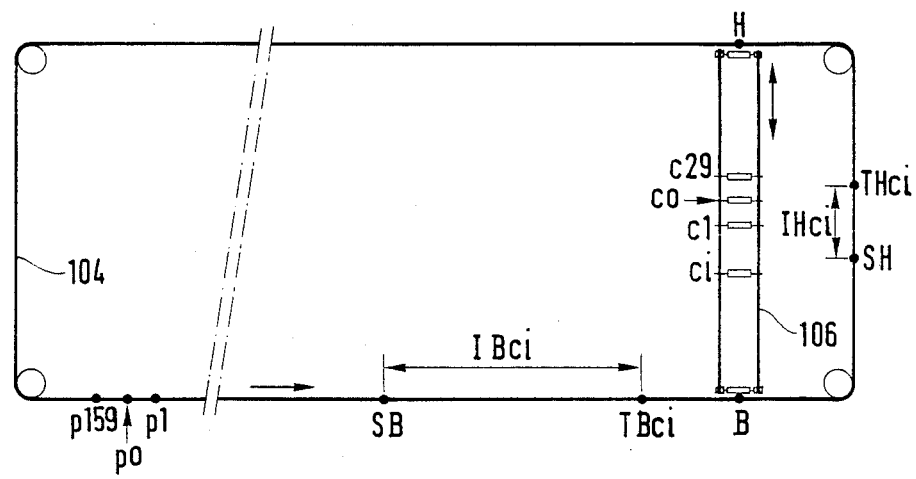
FIG. 28 is a diagram for use in explaining the algorithm used by the central control unit for organizing coincidences between the delivery conveyor and the sorting conveyor.

This algorithm and the stages therein for designating one of the packs in a sorting module are described below with reference to FIG. 28 which is a diagram showing:

the delivery conveyor 104 with the bucket positions on the conveyor being referenced p0, p1, . . . , p159, starting from the above-specified initial position p0, for a delivery conveyor having 160 buckets;

the sorting conveyor 106 with pack positions c0 to c29 for a sorting conveyor having 30 trays with the positions being counted from the position c0 where packs are loaded into the sorting module, (and ignoring any possible packs in any other possible sorting modules); and the top and bottom transfer members for transfer between the delivery conveyor and the sorting conveyor are marked H and B respectively.

The prediction algorithm consists in associating two lengths of the delivery conveyor with each of the various packs in the sorting module, with these lengths being referenced $IH_{ci}$ and $IB_{ci}$ for pack $c_i$, where $c0 \leq c_i \leq c29$. For each pack, e.g. the pack in position $c_i$, the length $IH_{ci}$ corresponds to one of the transfer members, namely the top transfer member H, and the other length $IB_{ci}$ corresponds to the other transfer member, namely the bottom transfer member B. They are both defined identically and they are limited by respective top and bottom thresholds depending on the transfer member concerned and referenced SH and SB for all of the packs, and by respective top and bottom processing limits depending on the transfer member concerned and referenced $TH_{ci}$ and $TB_{ci}$ for pack $c_i$.

Regardless of the pack concerned, the top or bottom threshold SH or SB corresponds to a defined given number of buckets upstream from the transfer member concerned, said number being chosen so that it is not greater than the number of buckets lying between the point of origin p0 and the first transfer member encountered by the buckets, in this example transfer member B. These thresholds SH and SB are fixed limits established solely as a function of the corresponding transfer member H or B, and constitute the upstream limits on the delivery conveyor for each processing interval.

In contrast, the top and bottom processing limits $TH_{ci}$ and $TB_{ci}$ depend on the pack $c_i$ under consideration. Given the speed of the delivery conveyor and the speed of the sorting conveyor, this limit represents the number of buckets which will move past the transfer member before the pack can arrive beneath it.

Starting with these various pairs of processing intervals associated with the packs, the algorithm for predicting the most favorable transfer selects a "most favourable" one of the intervals in order to designate the pack to which the selected interval is associated and then controls displacement of that pack to bring it under the corresponding transfer member. This interval selection or pack designation is obtained by applying, in order, a sequence of selection criteria, of which the most important are as follows:

Criterion 1: designate the pack having the largest number of receivable medicines in one or other of the intervals attributed thereto, and then select the appropriate transfer member. If a plurality of packs satisfy criterion 1, apply criterion 2.

Criterion 2: from the packs selected by applying criterion 1, select that pack for which the most distant medicine that it is to receive counting from the corresponding transfer member is in the most favorable position, i.e. is the least distant one of the most distant medicines in question. If a plurality of packs remain selected after criterion 2 has been applied, then apply criterion 3.

Criterion 3: from the packs selected by criterion 2, select the pack which is closest to its transfer member and whose opposite pack on the sorting conveyor has not yet been completely filled.

Criteria 1 and 2 on their own are essential and can be used on their own to designate a pack in satisfactory manner. Criterion 3 and other successive criteria are optional improvements.

In any event, if application of the pack-designating criteria does not result in just one pack being designated, then one of the potentially designatable packs is designated arbitrarily or the prediction algorithm is applied to the packs in the sorting module downstream from the sorting module previously considered.

It is also possible, by using successive intervals, to apply the prediction algorithm to the packs of one or other of the modules and to give different priorities to the modules.

Once one of the packs has been designated, it is moved into position under the appropriate transfer member. Once the pack has stabilized, the medicines which it may receive from its processing interval are transferred thereto. The corresponding buckets are recorded as being empty in the control unit.

The present invention has been described essentially with reference to the embodiments shown in the accompanying drawings. Obviously various modifications can be made thereto without going beyond the scope of the claims. In particular, some or all of the sorting modules may be fitted with only one transfer member, and a pair of sorting modules could be superposed rather than being juxtaposed, with the delivery conveyor passing over appropriate deflector wheels to zig-zag through the sorting conveyor loops of each of the sorting modules.

We claim:

1. A method of making up batches of small items in individual packs in response to a set of orders specifying the different varieties of item required in each batch together with the corresponding quantities thereof, and an installation comprising a storage bay storing a plurality of a possible varieties of item, variety by variety, a first endless delivery conveyor holding a plurality of buckets defining a closed loop delivery path for delivering individual items, the delivery conveyor running substantially around said installation with a clear space between opposite runs extending substantially along the installation; a station for injecting individual items onto said buckets mounted facing both said storage bay and said delivery conveyor at least one second endless sorting conveyor holding packs for sorting into batches the injected items, mounted orthogonally to the delivery conveyor and defining a closed loop sorting path, a transfer station for transferring items from said closed loop delivery path to said closed loop sorting path orthogonal to the delivery path for making up said batches, said method comprising the following steps:

memorizing a set of orders and combining the orders in the set to establish a list of all of the different varieties of item ordered together with the quantity of each variety required to make up all of the batches specified in the set of orders;

assigning the packs a corresponding one of the ordered batches of items;

taking each of the varieties of items in said list in succession from said storage bay and injecting the required quantity of items at said injection station one-by-one into said buckets of said delivery conveyor; and driving said delivery conveyor and said sorting conveyor to cause said items which have been injected into said buckets on the delivery conveyor to coincide with the packs that are to receive them in said at least one transfer zone between the paths and effecting transfer of each of said items at said transfer zone into a suitable pack.

2. A method according to claim 1, wherein said coincidences are established by causing said packs to move in one direction or the other around the corresponding closed loop sorting path, said movements being determined on the basis of first data associated with each item as it is injected into a bucket of said delivery conveyor and representing its location thereon, and on the basis of second data associated with each batch and the corresponding pack attributed thereto and representing the location of said pack on its closed loop sorting path.

3. A method according to claim 1, wherein coincidences between the injected items and the packs that are to receive them are organized by attributing a processing interval on each sorting path to each of the packs in the sorting path as seen from each of the transfer zones, in defining each processing interval between two limits related to the corresponding transfer zone, with the more upstream one of said limits from the corresponding transfer zones being a threshold limit representing a defined number of item positions on the first path, and with the other one of said limits being a processing limit representative of the number of items capable of being injected during the time interval required for displacing the pack under consideration to the transfer zone under consideration.

4. A method according to claim 3, wherein one of the packs on said sorting path is designated to be the pack which is positioned in a transfer zone to receive an item, the designated pack being selected by selecting that one of the processing intervals attributed to the various packs which contains the largest number of injected items suitable for being received by the corresponding pack.

5. A method according to claim 4, wherein a selection is made from a plurality of designated packs by determining the positions of the last items which each designated pack may receive from the processing interval attributed thereto, and by selecting the pack whose last item is least far from the corresponding transfer zone.

* * * * *